(12) United States Patent
Holler et al.

(10) Patent No.: US 9,364,845 B2
(45) Date of Patent: Jun. 14, 2016

(54) PAINTING INSTALLATION AND METHOD FOR OPERATING A PAINTING INSTALLATION

(71) Applicant: Dürr Systems GmbH, Bietigheim-Bissingen (DE)

(72) Inventors: Sebastian Holler, Korntal-Muenchingen (DE); Jan Scheerer, Stuttgart (DE); Jens Holzheimer, Tamm (DE); Dietmar Wieland, Waiblingen (DE); Michael Baitinger, Marbach (DE); Wolfgang Tobisch, Stuttgart (DE)

(73) Assignee: Dürr Systems GmbH, Bietigheim-Bissingen (DE)

(*) Notice: Subject to any disclaimer, the term of this patent is extended or adjusted under 35 U.S.C. 154(b) by 0 days.

(21) Appl. No.: 14/157,092

(22) Filed: Jan. 16, 2014

(65) Prior Publication Data
US 2014/0134339 A1    May 15, 2014

Related U.S. Application Data

(63) Continuation of application No. PCT/EP2012/058165, filed on May 3, 2012.

(30) Foreign Application Priority Data

Jul. 27, 2011 (DE) .......................... 10 2011 079 951
Jul. 29, 2011 (DE) .......................... 10 2011 052 298

(51) Int. Cl.
*B05B 15/12* (2006.01)
*B01D 46/00* (2006.01)

(52) U.S. Cl.
CPC ........ *B05B 15/1251* (2013.01); *B01D 46/0057* (2013.01); *B05B 15/1214* (2013.01); *B05B 15/1255* (2013.01); *B01D 2273/12* (2013.01); *Y02P 70/36* (2015.11)

(58) Field of Classification Search
CPC .......... B01D 2273/12; B01D 46/0057; B05B 15/1214; B05B 15/1251; B05B 15/1255
USPC ............................................. 427/345, 421.1
See application file for complete search history.

(56) References Cited

U.S. PATENT DOCUMENTS 2,394,710 A    2/1946   McAfee
2,571,380 A    10/1951  Penick
(Continued)

FOREIGN PATENT DOCUMENTS

CA    2 379 219    1/2001
CA    2 697 447    3/2009
(Continued)

*Primary Examiner* — Alexander Weddle
(74) *Attorney, Agent, or Firm* — Womble Carlyle Sandridge & Rice LLP

(57) ABSTRACT

In order to provide a painting installation for painting workpieces, which is compact in configuration and allows a reliable separation of paint overspray from a raw gas flow, the painting installation includes the following: a painting booth, in which the workpieces are paintable with paint; a conveying device, by means of which the workpieces to be painted are conveyable in a conveying direction through the painting booth; a separation and/or filter system for cleaning a raw gas flow, which is leaving the painting booth and has absorbed paint overspray in the painting booth, wherein the separation and/or filter system includes at least one filter device for separating the paint overspray from the raw gas flow; and at least one clean gas line for a clean gas flow, which is obtainable by cleaning the raw gas flow by means of the at least one filter device.

14 Claims, 20 Drawing Sheets

(56) References Cited

U.S. PATENT DOCUMENTS

| | | |
|---|---|---|
| 2,650,155 A | 8/1953 | Medlin |
| 4,017,422 A | 4/1977 | Gappa et al. |
| 4,537,120 A | 8/1985 | Josefsson |
| 5,078,084 A | 1/1992 | Shutic et al. |
| 5,165,969 A | 11/1992 | Barlett et al. |
| 5,766,355 A | 6/1998 | Josefsson et al. |
| 6,162,270 A | 12/2000 | Nystrom et al. |
| 6,226,568 B1 | 5/2001 | Tong et al. |
| 7,959,722 B2 | 6/2011 | Wieland et al. |
| 8,961,642 B2 | 2/2015 | Holler et al. |
| 2008/0229925 A1 | 9/2008 | Wieland et al. |
| 2010/0197213 A1 | 8/2010 | Holzheimer et al. |
| 2010/0199912 A1 | 8/2010 | Holzheimer et al. |
| 2011/0041691 A1 | 2/2011 | Weschke |
| 2011/0059258 A1 | 3/2011 | Fritz et al. |
| 2011/0274827 A1 | 11/2011 | Fritz et al. |
| 2012/0285323 A1 | 11/2012 | Holler et al. |
| 2013/0032089 A1 | 2/2013 | Link et al. |
| 2014/0130674 A1 | 5/2014 | Holler et al. |
| 2014/0230725 A1 | 8/2014 | Holler et al. |
| 2015/0283492 A1 | 10/2015 | Holler et al. |

FOREIGN PATENT DOCUMENTS

| | | |
|---|---|---|
| CA | 2 842 258 | 1/2013 |
| DE | 38 23 924 | 12/1989 |
| DE | 42 11 465 | 3/1996 |
| DE | 100 02 584 | 8/2001 |
| DE | 20 2005 013 403 | 12/2005 |
| DE | 10 2005 013 708 | 9/2006 |
| DE | 10 2007 041 008 | 3/2009 |
| DE | 10 2008 013 713 | 9/2009 |
| DE | 20 2010 012 437 | 12/2010 |
| DE | 10 2009 048 005 | 4/2011 |
| DE | 10 2009 058 206 | 6/2011 |
| EP | 0 356 658 | 3/1990 |
| EP | 0 756 885 | 2/1997 |
| EP | 1 704 925 | 9/2006 |
| EP | 2 039 436 | 3/2009 |
| GB | 2 024 041 | 1/1980 |
| JP | 05-084420 | 4/1993 |
| JP | 06-047245 | 2/1994 |
| WO | WO 03/092907 | 11/2003 |
| WO | WO 2010/069407 | 6/2010 |
| WO | WO 2010069407 A1 * | 6/2010 |
| WO | WO 2011/076600 | 6/2011 |

* cited by examiner

PAINTING INSTALLATION AND METHOD FOR OPERATING A PAINTING INSTALLATION

CROSS-REFERENCE TO RELATED APPLICATIONS

This application is a continuation application of PCT/EP2012/058165, filed on May 3, 2012, the entire specification of which is incorporated herein by reference. Further, this application claims the benefit of German application number 10 2011 079 951.6, filed on Jul. 27, 2011 and German application number 10 2011 052 298.0, filed on Jul. 29, 2011, which are incorporated herein by reference in their entirety and for all purposes.

FIELD OF DISCLOSURE

The present invention relates to a painting installation for painting workpieces.

BACKGROUND

A painting installation is known, for example from WO 2010/069407 A1, which comprises a separation and/or filter system, which is arranged below the painting booth.

SUMMARY OF THE INVENTION

The present invention is based on the object of providing a painting installation of the type mentioned at the outset, which is compact in configuration and allows reliable separation of paint overspray from the raw gas flow.

This object is achieved according to the invention in that the painting installation comprises a painting booth, in which the workpieces are paintable with paint, and a conveying device, by means of which the workpieces to be painted are conveyable in a conveying direction through the painting booth. Furthermore, the painting installation comprises a separation and/or filter system for cleaning a raw gas flow, which is leaving the painting booth and has absorbed paint overspray in the painting booth, the separation and/or filter system comprising at least one filter device for separating the paint overspray from the raw gas flow, and at least one clean gas line for a clean gas flow, which is obtainable by cleaning the raw gas flow by means of the at least one filter device.

The separation and/or filter system will be referred to below as the "filter system" for simplification.

It is provided in one configuration of the invention that at least one clean gas line is arranged, at least in portions within an outer contour of at least one filter device.

An outer contour of the filter device is to be taken to mean, in this description and the accompanying claims, the outer delimitation of the spatial region, which, when each cross-section of the filter device taken perpendicular to the conveying direction is moved along the conveying direction up to the ends of the painting installation, is passed through by at least one of these cross-sections.

In particular when at least one clean gas line is arranged, at least in portions, within an outer contour of at least one filter device, the filter system can be compact in configuration. In particular, it may be provided that no clean gas line projects beyond lateral delimiting walls of the filter system.

The movement of a cross-section along the conveying direction to determine the outer contour takes place in such a way that the moved cross-section is always oriented perpendicular to the local conveying direction. When a conveying direction is not constant (in the case of a curved conveying path), a cross-section is consequently rotated in accordance with the course of the respective local conveying direction during the movement to the ends of the painting installation.

In particular, the clean gas line is therefore, at least in portions, arranged within a spatial region, which, in the case of an imaginary extension of delimiting walls of the filter device running at least approximately parallel to the conveying direction, is delimited by these extended delimiting walls.

The at least one clean gas line is therefore preferably arranged, at least in portions, within a horizontal projection of at least one filter device along the conveying direction.

At least one outer delimiting wall, remote from a vertical longitudinal center plane of the painting booth, of at least one clean gas line is preferably spaced apart to the same extent or to a lesser extent from the vertical longitudinal center plane of the painting booth than an outer delimiting wall of the filter device remote from the vertical longitudinal center plane of the painting booth.

A clean gas flow is preferably guidable by means of at least one at least approximately vertically oriented clean gas line along at least one filter device, at least approximately vertically downwardly.

In particular when the filter system comprises a plurality of filter devices arranged one after the other in the conveying direction, it may be provided that at least one clean gas line is arranged between two filter devices arranged one after the other in the conveying direction.

At least one filter device is preferably configured as a regenerable filter device.

A regenerable filter device is to be taken to mean a separation device for separating impurities from a gas flow guided through the painting booth, in particular to separate paint overspray from a gas flow containing overspray particles, in which separated impurities can be cleaned off, without having to exchange filter elements of the filter device.

Provided as a regenerable filter device (filter arrangement) according to the invention is also, in particular, a filter device, which has one or more dry filter elements and/or dry separation devices, in which a gas flow is cleaned substantially without the addition of a liquid to the filter elements. Depending on this, subsequent or prior cleaning stages may in turn be provided using (in normal conditions) liquid solvents or cleaning agents.

It may furthermore be provided in a regenerable filter device that the filter device comprises at least one filter element, which, during filter operation, is provided with a barrier layer and/or a protective layer, which comprises auxiliary filter material, for example rock flour.

The filter element can thus be prevented from becoming clogged with impurities from the gas flow fed to the filter device during filter operation of the filter device. By cleaning the barrier layer or the protective layer from the filter element of the filter device, a particularly easy regeneration of the filter element can take place, which is then reusable by applying a fresh barrier layer or a fresh protective layer.

Powder paint or fluid paint, in particular, can be considered as the paint.

A paint with a flowable consistency, from liquid to pasty (for example in the case of a PVC plastisol) is designated by the term "fluid paint" here—in contrast to the term "powder paint". The term "fluid paint" comprises, in particular, the terms "liquid paint" and "wet paint".

When using fluid paint, the paint overspray from the painting booth is therefore a fluid paint overspray and when using wet paint it is a wet paint overspray.

In one configuration of the invention it is provided that the filter system comprises at least one raw gas shaft, which is arranged substantially centrally below the painting booth with respect to a horizontal direction running perpendicular to the conveying direction.

It may, in particular, be provided here that an inflow opening of the raw gas shaft is arranged substantially centrally below the painting booth with respect to a horizontal direction running perpendicular to the conveying direction.

The raw gas shaft is preferably used to feed the gas flow from the painting booth to at least one filter device of the filter system.

A gas flow with a vertical movement component, in particular in the substantially vertical direction, preferably flows through the raw gas shaft during a filter operation of the filter system, in which the gas flow coming from the painting booth is cleaned.

A lower end of the raw gas shaft preferably adjoins at least one inlet channel of at least one filter device of the filter system.

It may be favorable if at least two filter devices, preferably all the filter devices of the filter system, are arranged on the same side of the raw gas shaft with respect to a vertical longitudinal center plane of the painting booth.

It may be advantageous if the raw gas shaft extends from above at least one filter element of the at least one filter device and/or to below at least one filter element of the at least one filter device.

In one configuration of the invention, it is provided that the filter system comprises at least one clean gas line, which is guided, at least in portions, spatially below a raw gas shaft, in particular is arranged under the raw gas shaft. A raw gas flow can thus be guided particularly easily from the one side of the vertical longitudinal center plane of the painting booth to the opposing side. In particular, at least one clean gas line can cross the raw gas shaft without a collision.

As an alternative or in addition to this, it may be provided that at least one clean gas line is guided, at least in portions, spatially above a raw gas shaft, in particular is arranged above the raw gas shaft, and therefore crosses the latter, preferably above it.

At least one clean gas line preferably extends through below the raw gas shaft and preferably runs here substantially in the horizontal direction and/or transversely, in particular substantially perpendicularly, to the conveying direction.

It may furthermore be provided that at least one clean gas line is arranged, at least in portions, within a vertical projection of at least one filter device below and/or above the at least one filter device.

It may be favorable if at least one clean gas line is arranged, at least in portions, below, in particular under, at least one auxiliary filter material introduction mechanism, at least one auxiliary filter material receiving container and/or at least one housing of at least one filter device.

It may be provided that the filter system comprises a clean gas line, which crosses a raw gas shaft and/or traverses it.

The clean gas line comprises a portion which is arranged within the raw gas shaft, and may comprise one or more further portions, which are arranged outside the raw gas shaft.

In particular, it may be provided that the filter system comprises a clean gas line, which is arranged in the region of the upper end of the raw gas shaft and traverses it.

Raw gas therefore preferably flows around the clean gas line during operation of the painting installation. By means of the clean gas line, the clean gas flow can preferably be guided from the one side of the vertical longitudinal center plane of the painting booth to the opposite side.

It may, however, also be provided that at least one clean gas line is arranged at another point between the lower end and the upper end of the raw gas shaft or above the raw gas shaft, preferably below the painting booth base.

The clean gas line preferably runs substantially in the horizontal direction and/or transversely, in particular substantially perpendicularly, with respect to the conveying direction.

It may be favorable if the filter system comprises at least one clean gas collecting channel, into which at least two clean gas lines of the filter system open. The clean gas can then be guided away particularly easily using only one line, which adjoins the clean gas collecting channel downstream.

At least one clean gas collecting channel preferably extends least approximately parallel to the conveying direction.

It is provided in one configuration of the invention that at least one clean gas collecting channel, on the one hand, and at least two filter devices of the filter system, on the other hand, are arranged on mutually opposite sides of the filter system with respect to a vertical longitudinal center plane of the painting booth.

In particular, it may be provided that at least one clean gas collecting channel of the filter system is divided along the conveying direction, in particular by means of a partition wall extending along the conveying direction, into two regions, namely an upstream region and a downstream region.

At least two clean gas lines preferably open into the upstream region, which therefore forms a mouth region of the two regions of the clean gas collecting channel.

A mixing of the clean gas flows fed by means of the at least two clean gas lines to the clean gas collecting channel preferably already takes place in the mouth region of the at least two regions of the clean gas collecting channel.

In one configuration of the invention it is provided that the downstream region of the clean gas collecting channel is a discharge region of the two regions of the clean gas collecting channel, which is used to discharge the clean gas from the filter system and, for example, has a fluid connection to a circulating air guidance device for (renewed) feeding of the clean gas flow to the painting booth and/or to an exhaust air guidance device to remove the raw gas flow from the painting installation.

The mouth region of the clean gas collecting channel preferably has a fluid connection to the discharge region of the clean gas collecting channel by means of at least one fan. The gas arranged in the mouth region of the clean gas collecting channel can thus be particularly easily fed to the discharge region of the clean gas collecting channel.

It may be advantageous if the mouth region of the clean gas collecting channel is arranged, at least in portions, preferably completely, below, in particular under, the discharge region of the clean gas collecting channel.

It is provided in one configuration of the invention that at least one fan (blower) is connected, directly or indirectly, by means of a gas channel to a partition wall of at least one clean gas collecting channel.

It may be advantageous if at least one fan is arranged on the base, on which the painting installation is constructed in the assembled state, and a gas channel is provided to connect the fan to the partition wall.

It may furthermore be provided that at least one fan with a receiving device (frame) is provided, the receiving device being arranged on the base and the at least one fan being arranged at, in particular on, the receiving device. A gas channel is preferably provided to connect the fan to the partition wall.

It may be favorable if at least one fan is arranged on the partition wall of at least one clean gas collecting channel and/or is integrated in the partition wall. An additional gas channel to connect the fan to the partition wall may thus be dispensable.

In a further configuration of the invention it is provided that at least one fan is arranged at, in particular on, a receiving device, which is arranged at, in particular on, a partition wall of a clean gas collecting channel, at least one gas channel being provided to connect the at least one fan to the partition wall.

The filter system preferably comprises at least one conditioning device for conditioning at least one gas flow, in particular at least one clean gas flow. In particular, it may be provided that the conditioning device is configured as a heating device, cooling device, humidifying device and/or dehumidifying device.

At least one conditioning device is preferably arranged in a clean gas collecting channel of the filter system or before a clean gas collecting channel of the filter system with respect to a flow direction of the gas flow, in particular the clean gas flow.

The filter system preferably comprises at least one fan, for example at least one axial fan, to drive the gas flow.

The at least one fan may, for example, be arranged in the clean gas line and therefore before a clean gas collecting channel of the filter system with respect to a flow direction of the gas flow, into which channel the at least one clean gas line opens.

As an alternative or in addition to this, it may be provided that at least one fan is arranged downstream of the clean gas line and/or of the clean gas collecting channel with respect to the flow direction of the gas flow.

At least one fan may comprise an impeller, which is drivable by means of a drive.

A rotational axis of the impeller of the fan may be oriented substantially horizontally and transversely, preferably substantially perpendicularly, to a longitudinal direction of the painting booth and/or with respect to a conveying direction of the painting installation.

The drive of the impeller may be arranged in a transverse direction directed perpendicular to a longitudinal direction of the painting booth and/or perpendicular to a conveying direction, laterally next to the fan, in particular laterally next to the impeller.

The drive of the impeller may be at least partially arranged, preferably substantially completely arranged, outside the base area of the painting booth or outside a vertical projection of the base face of the painting booth.

The rotational axis of the impeller of the fan may, however, also be oriented differently, for example substantially horizontally and substantially parallel to a longitudinal direction of the painting booth and/or to a conveying direction. Furthermore, the rotational axis of the impeller may also be oriented substantially vertically.

The drive of the impeller may be arranged in a longitudinal direction of the painting booth and/or in a conveying direction before or behind the fan.

The drive of the impeller may also be arranged vertically below or above the fan.

The drive of the impeller may be arranged, at least partly, preferably substantially completely, within the base area of the painting booth or within a vertical projection of the base face of the painting booth.

It is favorable if the filter system comprises at least one clean gas line, at least one fan, at least one conditioning device and/or at least one clean gas collecting channel, which are arranged within a vertical projection of the painting booth below the painting booth.

The filter system preferably comprises at least one filter module, which comprises at least one portion of at least one raw gas shaft, at least one filter device, at least one clean gas line, at least one conditioning device, at least one portion of at least one clean gas collecting channel and/or at least one fan.

A filter module is a structural unit here, which comprises the constituents mentioned at least partly preassembled, preferably completely assembled, so the filter module can be preassembled or finished at a site that is different from the assembly site of the painting booth and can be connected to the remaining components of the painting installation with a low assembly outlay after transportation to the assembly site.

The filter system preferably comprises at least two filter modules.

In particular when the filter module comprises at least one portion of at least one clean gas collecting channel and/or at least one raw gas shaft, the at least one clean gas collecting channel or the at least one raw gas shaft can be completed by arranging the filter modules in a row next to one another in the conveying direction of the conveying device of the painting installation and by a fluid-tight connection of the individual portions of the at least one clean gas collecting channel or the at least one raw gas shaft to one another.

It may be advantageous if at least one safety filter (policing filter, emergency filter) is provided in at least one clean gas line and/or in the clean gas collecting channel in order to prevent an undesired penetration of auxiliary filter material and/or overspray particles into the regions of the filter system to be kept clean in the event of damage to a filter device, for example damage to a filter element of a filter device.

The present invention furthermore relates to a filter module for use in a filter system of a painting installation, the filter module comprising at least one filter device, at least one clean gas line, at least one conditioning device, at least one raw gas shaft portion, at least one clean gas collecting channel portion and/or at least one fan.

The present invention is based on the further object of providing a painting installation, which allows a particularly reliable separation of paint overspray from the raw gas flow.

This object is achieved according to the invention in that in the painting installation, at least one filter device for separating paint overspray from a raw gas flow containing overspray particles comprises the following:

a housing, which delimits a raw gas chamber of the filter device and in which at least one filter element of the filter device is arranged;

at least one inlet channel for letting the raw gas flow into the raw gas chamber of the filter device; and at least one auxiliary filter material introduction mechanism for introducing auxiliary filter material into the raw gas flow.

Since at least one auxiliary filter material introduction mechanism for introducing auxiliary filter material into the raw gas flow is provided, auxiliary filter material can be fed to the raw gas flow particularly easily, so an efficient and reliable separation of paint overspray from the raw gas flow is possible. In particular, a compressed air device for swirling auxiliary material can thereby be dispensed with.

At least one inlet channel of at least one filter device is preferably configured in such a way that the raw gas flow is guidable at an acute angle to the horizontal into the raw gas chamber.

It may be advantageous if at least one auxiliary filter material introduction mechanism comprises a treatment device for mechanically treating auxiliary filter material and/or a mixture of auxiliary filter material and overspray particles.

A "mechanical treatment" of auxiliary filter material or a mixture of auxiliary filter material and overspray particles is to be taken to mean a treatment in such a way that the treatment device comes into direct contact with the auxiliary filter material or with the mixture of auxiliary filter material and overspray particles in order, for example, to move, convey, to mix, to grind and/or loosen the latter.

It may be favorable if the treatment device is configured as a mixing device.

In particular, it may be provided that a mixing device is used for mixing auxiliary filter material, which is loaded with paint overspray, and auxiliary filter material, which is not loaded, or only to a small extent, with paint overspray.

At least one treatment device for mechanical treatment preferably comprises at least one treatment element, which is, for example, configured as a paddle and is rotatable about an axis.

At least one treatment device is preferably used for breaking up agglomerates of auxiliary filter material and paint overspray.

At least one treatment device preferably comprises at least one loosening element for loosening auxiliary filter material. In particular, it may be provided here that at least one loosening element be configured as a paddle and/or as a scoop.

At least one loosening element is, in particular, provided to make the auxiliary filter material (or the mixture of auxiliary filter material and overspray particles) carry out an inner movement in such a way that a proportion of more than 10% of the particles (auxiliary filter material particles and/or overspray particles; based on the total mass, the particle number and/or the total volume) are moved relative to adjacent particles. This produces a loosening, mixing, conveyance and/or crushing. In the case of the latter, at least one loosening element cooperates with at least one counterpiece, the at least one loosening element and the at least one counterpiece preferably having, during normal operation, different speeds and the auxiliary filter material thus being able to be mechanically processed between the at least one loosening element and the at least one counterpiece.

At least one treatment device preferably comprises at least one conveying element for conveying auxiliary filter material, for example in a direction parallel to the conveying direction of the conveying device of the painting installation.

It may furthermore be provided that the at least one treatment device comprises at least one treatment element, which is rotatable about a rotational axis running, for example horizontally, in particular substantial parallel, to the conveying direction and which is configured, for example, as a loosening element, a mixing element and/or conveying element.

A raw gas flow fed to the raw gas chamber is preferably directed in such a way that it flows in transversely, in particular substantially perpendicularly, with respect to the rotational axis of the treatment device into the raw gas chamber. In particular, it may be provided that the raw gas flow is directed substantially perpendicularly to the rotational axis of at least one treatment device.

It may be advantageous if at least one treatment device cooperates with a removal device of the filter device, for example with a removal opening to remove auxiliary filter material from the raw gas chamber of the filter device. In particular, it may be provided that the treatment device allows the conveyance of auxiliary filter material or a mixture of auxiliary filter material and overspray particles toward a removal opening.

As an alternative or in addition to this, it may be provided that a uniform distribution of auxiliary filter material or a mixture of auxiliary filter material and overspray particles is achievable by means of at least one treatment device in an auxiliary filter material receiving container of the filter device.

At least one auxiliary filter material introduction mechanism is preferably arranged in an auxiliary filter material receiving container of at least one filter device.

The present invention furthermore relates to a painting installation, which comprises a filter system, in which at least one flow guidance device is provided to influence the flow of a raw gas flow.

The invention is based, in this regard, on the object of providing a painting installation, which comprises a filter system, which allows a reliable separation of paint overspray from a raw gas flow.

This object is achieved according to the invention in that at least one flow guidance device comprises at least one flow influencing element.

As a result, a raw gas flow can be influenced particularly advantageously in order to be able to reliably separate paint overspray from the raw gas flow.

A "flow influencing element" will be designated a "flow element" below for simpler reference.

It is provided in one configuration of the invention that at least one auxiliary filter material introduction mechanism comprises a flow guidance device for influencing the flow of the raw gas flow, which comprises at least one flow element.

It may be advantageous if at least one flow guidance device comprises at least one flow element, which is variable with regard to configuration and/or arrangement and/or orientation. The raw gas flow can thus be used to loosen and/or swirl auxiliary filter material and therefore to introduce auxiliary filter material into the raw gas flow.

It may be provided, in particular, that at least one variable flow element is configured as an adjustably and/or a pivotably arranged guide plate.

It may be advantageous if at least one flow guidance device is at least partly arranged in at least one inlet channel of the filter device. In particular, it may be provided that at least one flow guidance device forms a delimitation of the inlet channel.

At least one flow element of at least one flow guidance device is preferably variable with regard to configuration and/or arrangement and/or orientation before, during and/or after an operation of the filter device. In particular, it may be provided that at least one flow element is variable with regard to configuration and/or arrangement and/or orientation before, during and/or after a filter operation, in which a raw gas flow can be cleaned by means of the filter device. Furthermore, it may be provided that at least one flow element is variable with regard to configuration and/or arrangement and/or orientation before, during and/or after a cleaning operation of the filter device, in which at least one filter element of the filter device can be cleaned, in other words freed from adhering auxiliary filter material and paint overspray.

At least one flow element of at least one flow guidance device is furthermore preferably pre-adjustable before starting up the filter device and/or automatically adjustable, in particular self-adjusting, during an operation, in particular a filter operation, of the filter device.

It may be particularly favorable if at least one variable flow element of at least one flow guidance device is automatically adaptable to different flow states during operation of the filter device, in particular during filter operation of the filter device.

It may be advantageous if at least one variable flow element of at least one flow guidance device automatically adapts, owing to its design, in particular owing to its own weight, to different flow states during operation of the filter device, in particular to a volume flow of the raw gas flow.

It may be provided, for example, that the mass of at least one flow element is selected such that a varying opening cross-section of the inlet channel in a direction perpendicular to the flow direction of the raw gas flow is automatically produced in the inlet channel by a raw gas flow that varies with respect to its volume flow.

At least one flow element of at least one flow guidance device is preferably configured in such a way that an angle, at which the raw gas flow flows into the raw gas chamber, is adjustable by means of the at least one flow element.

It may be advantageous if the speed of the raw gas flow flowing into the raw gas chamber can be influenced, in particular increased, by means of at least one flow element of at least one flow guidance device. The speed of a gas flow is to be taken to mean here the average speed of the gas flow, local speed differences resulting, for example, from turbulences being disregarded.

It may, in particular, be provided here that the speed of the raw gas flow into at least one inlet channel of at least one filter device is influenced, in particular increased, compared to the speed of the raw gas flow into at least one raw gas shaft of the filter system by means of at least one flow element of at least one flow guidance device.

It may be favorable if a raw gas flow guided through at least one raw gas shaft is guided away or deflected by means of at least one flow guidance device and/or by means of at least one inlet channel of at least one filter device, asymmetrically, in particular only toward one side of the vertical longitudinal center plane of the painting booth, with respect to the vertical longitudinal center plane of the painting booth.

It may be advantageous if, by means of at least one flow guidance device, the raw gas flow introduced into the raw gas chamber is directed directly into at least one auxiliary filter material receiving container of at least one filter device. It may be advantageous if, as a result, auxiliary filter material is swirled and/or picked up by the raw gas flow.

The raw gas flow loaded with auxiliary filter material and with overspray particles is preferably deflected with a vertical movement component, for example substantially vertically upwardly, and/or fed flowing substantially vertically upwardly or at least with a movement component directed vertically upwardly, to at least one filter element of at least one filter device.

The use of at least one variable flow element of at least one flow guidance device preferably provides the advantage that the raw gas flow introduced into the raw gas chamber is feedable in a specific manner to at least one auxiliary filter material receiving container of at least one filter device.

It is provided in one configuration of the invention that at least one flow element is configured as a guide plate. The raw gas flow can thus be guided in a specific manner in a predetermined direction.

It may be advantageous if at least one flow element is manually adjusted and fixed in a preferred annular position.

As an alternative or in addition to this, it may be provided that at least one flow element is configured as a self-adjusting flow element. Thus, it may, for example, be provided that the at least one flow element has a small mass so that it closes at least one inlet channel of at least one filter device because of the gravitational force, when no raw gas flow is fed to the filter device, and therefore, in particular, prevents an escape of auxiliary filter material from the filter device back into the painting booth counter to a flow direction of the raw gas flow.

At least one flow element of at least one flow guidance device is preferably rotatably arranged, for this purpose, about an axis oriented transverse, in particular substantially perpendicular, to the vertical direction.

The mass of at least one flow element of at least one flow guidance device is preferably selected such that the at least one flow element is movable by an inflow of the raw gas flow into a raw gas chamber of at least one filter device by the raw gas flow from a closed position into an open position.

A counter-pressure resulting from the mass (own weight) of the at least one flow element is then preferably kept in balance by a pressure exerted by the raw gas flow.

The pressure applied by the raw gas flow on at least one flow element of at least one flow guidance device is preferably proportional to the volume flow of the raw gas flow.

Depending on the volume flow of the raw gas flow, a cross-section of at least one inlet channel of at least one filter device is preferably adjustable, preferably automatically, in particular by means of a variable flow element.

It may, in particular, be provided that, depending on the volume flow of the raw gas flow, an inflow angle of the raw gas flow into at least one raw gas chamber of at least one filter device is automatically adjustable by means of at least one variable flow element. An adaptation of the quantity of auxiliary filter material, which is swirled by the raw gas flow and picked up by the raw gas flow, can thus be automatically adjusted.

At least two flow elements of at least one flow guidance device are preferably provided and form mutually opposing delimiting walls of at least one inlet channel of at least one filter device. In this manner, a specific influencing of the raw gas flow flowing in through the inlet channel into the raw gas chamber can take place.

In particular, it may be provided that at least two variable flow elements are provided, which limit at least one inlet channel of at least one filter device in the vertical direction. It may be advantageous if a relative position of at least two flow elements of at least one flow guidance device is adjustable relative to one another.

In particular, it may be provided that at least one flow element is displaceably and/or rotatably arranged relative to at least one further flow element.

It is provided in one configuration of the invention that a plurality of flow elements, which are arranged adjacent to one another in the conveying direction of the conveying device of the painting installation, of at least one flow guidance device are provided, which are adjustable separately from one another, so that at least one flow guidance device, and therefore one filter device, are adaptable to different raw gas flows with volume flows varying along the conveying direction. It can thus, in particular, be ensured that, even in the case of different volume flows, at least a desired minimum quantity of auxiliary filter material can always be picked up by the raw gas flow when it flows into the filter device.

Furthermore, it may be provided that at least one flow element of at least one flow guidance device is displaceably arranged in a horizontal direction. The raw gas flow guided through at least one inlet channel of at least one filter device can thus be fed in a specific manner to different regions of the raw gas chamber, in other words different regions of an interior of the filter device, in which the raw gas flow is present during the filter operation, in particular different regions of the auxiliary filter material receiving container of the filter device.

At least one flow guidance device is preferably configured in such a way that a raw gas flow is feedable by means of the flow guidance device to the filter device in such a way that the raw gas flow flows above a treatment device of the filter device and/or directed onto the treatment device into the raw gas chamber of the filter device.

In a further configuration of the invention it may be provided that at least one flow element of at least one flow guidance device is rotatably and/or horizontally and/or vertically movable by means of a drive device, for example by means of a motor-controlled drive device.

It may be advantageous if a specific adjustment of an orientation and/or positioning of at least one flow element is configured to be carried out automatically by means of at least one flow guidance device depending on an operation mode of at least one filter device, for example a cleaning operation, in which at least one filter device is cleaned, or a danger state, for example if a fire alarm is triggered. At least one flow element can thus be used as a safety device, for example as a fire protection element.

In one configuration of the invention it may be provided that the auxiliary filter material introduction mechanism comprises a control device, by means of which an introduction capacity of the at least one auxiliary filter material introduction mechanism is configured to be controlled and/or regulated.

The introduction capacity of the auxiliary filter material introduction mechanism is to be taken to mean, in this description and the accompanying claims, a measure of the quantity of auxiliary filter material, which can be introduced in a predetermined time into the raw gas flow by means of the auxiliary filter material introduction mechanism.

It may be advantageous if the introduction capacity of the auxiliary filter material introduction mechanism is configured to be controlled and/or regulated by means of the control device in such a way that the capability of the auxiliary filter material introduced into the raw gas flow to absorb overspray particles from the raw gas flow is at least approximately constant.

It may be advantageous if the quantity of introduced auxiliary filter material is controlled and/or regulated depending on the specific absorption capacity of the auxiliary filter material. The specific absorption capacity then represents what quantity of paint overspray can be absorbed by a predetermined quantity of auxiliary filter material. The specific absorption capacity therefore changes depending on a loading state of the auxiliary filter material with paint overspray. In particular, the specific absorption capacity reduces with an increasing operating period of the filter device.

As an alternative or in addition to this, it may be provided that the specific absorption capacity is controlled and/or regulated by means of the treatment device, for example by means of a regulated and/or controlled regular exchange of the auxiliary filter material and/or by means of a control and/or regulation of a mixing process and/or a grinding process. The capability of the auxiliary filter material introduced into the raw gas flow to absorb overspray particles from the raw gas flow can thus be kept at least approximately constant, in particular in the case of a constant introduction capacity of the auxiliary filter material introduction mechanism.

Furthermore, it may be provided that a control and/or regulation of the introduction capacity takes place by means of the control device depending on the loading state of the auxiliary filter material, on the quantity of auxiliary filter material in the auxiliary filter material receiving container, on the mass of the auxiliary filter material in the auxiliary filter material receiving container, on the flow speed of the raw gas flow in the inlet channel, on the difference between the pressure in the raw gas chamber and in the clean gas line and/or a degree of contamination of the raw gas flow with overspray particles.

In particular, it may be provided that an introduction capacity of the auxiliary filter material introduction mechanism is configured to be controlled and/or regulated by means of an adjustment of at least one flow element. In particular, it may be provided for this purpose that a position and/or an angular position of at least one flow element is adapted, controlled and/or regulated for this purpose.

As an alternative or in addition to this, it may furthermore be provided that by means of at least one treatment device for mechanically treating the auxiliary filter material and/or the mixture of auxiliary filter material and overspray particles, the introduction capacity is adaptable, in particular configured to be controlled and/or regulated. In particular, it may be provided here that a rotational speed of rotating (treatment) elements of at least one treatment device is adjustable, in particular configured to be controlled and/or regulated, to control and/or regulate the introduction capacity.

It may be advantageous if at least one filter device of the filter system comprises at least one flow guidance device, which is arranged in the raw gas chamber of the filter device and by means of which the raw gas flow flowing through at least one inlet channel of the filter device into the raw gas chamber is configured to be influenced. In this manner, a raw gas flow can be fed in a specific manner to at least one filter element of at least one filter device in order to obtain an advantageous separation of overspray particles from the raw gas flow.

At least one flow guidance device preferably comprises, for this purpose, at least one element that is different from delimiting walls of at least one filter device, for example, an, in particular variable, flow element.

It may be advantageous if the raw gas flow flowing through at least one inlet channel of the filter device into the raw gas chamber can be deflected toward at least one filter element of at least one filter device by means of at least one flow guidance device.

Furthermore, it may be provided that the raw gas flow flowing through at least one inlet channel of the filter device into the raw gas chamber can be swirled by means of at least one flow guidance device. A turbulent flow within the raw gas chamber can thus be obtained, so a better mixing of the overspray particles and the particles of the auxiliary filter material, and therefore a better separation of the overspray particles from the raw gas flow, can be obtained.

In particular when a swirling of the raw gas flow fed to the raw gas chamber is to be achieved by means of at least one flow guidance device, it may be provided that at least one flow guidance device comprises at least one flow element, for example configured as a diffuser. In particular, at least one rod-shaped flow element may be provided.

It may furthermore be provided that at least one flow guidance device comprises at least one flow element, which is configured, for example, as a guide plate and by means of which projections and/or other points of the filter device, which disturb a preferred flow of the raw gas flow in the raw gas chamber, can be bridged.

It may be advantageous if at least one flow element of at least one flow guidance device is provided with openings, through which auxiliary filter material can pass during filter operation of the filter device. In this manner, auxiliary filter material can be applied to all the surfaces facing the raw gas chamber and a reliable protection of these surfaces can be achieved against undesired contamination with paint overspray.

It may furthermore advantageously be provided that at least one flow element configured as a guide plate has a plurality of openings and/or preferably serves as a diffuser.

A diffuser is to be taken to mean, in this description and the accompanying claims, in particular an element, which promotes a swirling of flows guided along it. In particular, this may be taken to mean an element, by means of which a laminar flow can be swirled, so that a turbulent flow is produced.

In one configuration of the invention, it is provided that at least one flow element of at least one flow guidance device is arranged, in particular fixed, in a laminar region of the raw gas chamber, in which a substantially laminar flow prevails during filter operation of the filter device, and/or extends into a turbulence region of the raw gas chamber of the filter device, in which a turbulent flow prevails or is to be produced during filter operation of the filter device.

The use of at least one flow element of at least one flow guidance device may, in particular, provide the advantage that the raw gas flow containing overspray particles can flow substantially uniformly against at least one filter element of at least one filter device. Furthermore, undesired accumulations of auxiliary filter material within the raw gas chamber can be reduced by this, in particular completely avoided.

It is provided in one configuration of the invention that the painting installation, in particular the filter system of the painting installation, comprises a conditioning device, which comprises a cooling device, a humidifying device and/or a drop separation device. Furthermore, the conditioning device preferably comprises an, in particular common, liquid handling system for the cooling device, the humidifying device and/or the drop separation device. A gas flow guided through the conditioning device can thus be particularly efficiently cooled and/or humidified. Furthermore, drops located in the gas flow can thus be easily separated.

It may be provided that the conditioning device comprises a cooling device and a humidifying device, the humidifying device being arranged downstream of the cooling device with respect to a through-flow of the direction of the conditioning device.

It may furthermore be provided that the conditioning device comprises a cooling device and a drop separation device, the drop separation device preferably being arranged downstream of the cooling device with respect to the through-flow direction of the conditioning device.

It may be favorable if the conditioning device comprises a heating device. A heating device of this type may, for example, be arranged downstream of the cooling device and/or upstream of the humidifying device with respect to the through-flow direction of the conditioning device.

It may furthermore be favorable if the conditioning device comprises at least two drop separation devices, one drop separation device preferably being arranged upstream of a humidifying device with respect to the through-flow direction of the conditioning device and a further drop separation device being arranged downstream of the humidifying device.

It is provided in one configuration of the invention that the conditioning device comprises a liquid handling system, by means of which condensate, which forms on the cooling device, and/or liquid not absorbed by the gas flow, which is discharged by the humidifying device, is receivable.

In particular, it may be provided that the liquid handling system has a collecting trough, which is preferably arranged under the cooling device, under the humidifying device and/ or under the drop separation device. The liquid handling system preferably comprises a common collecting trough for the cooling device, the humidifying device and/or the drop separation device, so that substantially the entire liquid not absorbed by the gas flow and accumulating in the conditioning device is collectable in the common collecting trough.

It may be favorable if, by means of the humidifying device, liquid is configured to be applied, in particular sprayed, on the cooling device. As a result, the surface of the cooling device, over which the gas flow flows, can be wetted with liquid to increase the efficiency of the moistening. The cooling device may thus be used as an addition or replacement for a phase interface provider.

A substance transition from a liquid phase to the vapor phase can be facilitated by means of a phase interface provider, in particular for moistening. In particular, a surface of the liquid can be increased here.

It may, for example, be provided that a phase interface provider, for example the cooling device, is formed by a knitted fabric with a large surface, for example a wire knitted fabric, to which liquid is applied, in particular over which liquid is made to flow or is sprayed. Alternatively or in addition to this, it may be provided that liquid is applied to a filling body, for example made of activated carbon, in particular made to flow over it or sprayed thereon, and, simultaneously, the gas is made to flow through it, in order to bring as large a surface of liquid as possible into contact with the gas flow.

A phase interface provider can furthermore provide the advantage that drops in the gas flow are separated. A phase interface provider can therefore also be used as a drop separation device.

It may be advantageous if the cooling device is simultaneously used as a drop separation device.

It may furthermore be provided that the cooling device is used as a homogenizing device to homogenize the gas flow in the conditioning device. A homogenizing device of this type may also be called a flow equalizer.

Preferably therefore, the functions of a phase interface provider and/or a flow equalizer are therefore integrated into the cooling device.

A conditioning device of this type may provide the advantage that a pressure loss produced when the gas flow flows through the conditioning device is reduced.

Furthermore, a conditioning device of this type may have a compact structure, so a space requirement is reduced.

The number of components of the conditioning device can be reduced by this.

The present invention is based on the further object of providing a method for operating a painting installation, which allows a reliable separation of paint overspray from a raw gas flow loaded with paint overspray.

This object is achieved according to the invention in that the following method steps are carried out:
- conveying the workpieces in a conveying direction through the painting booth by means of a conveying device and painting the workpieces in the painting booth;
- feeding a raw gas flow from the painting booth of the painting installation, which has absorbed paint overspray in the painting booth, to a filter system;
- separating paint overspray from the raw gas flow loaded with overspray particles by means of at least one filter device of the filter system, so that a clean gas flow is obtained.

The method according to the invention preferably has the features and/or advantages described above in connection with the painting installation according to the invention.

It may be advantageous if the clean gas flow is discharged by means of at least one clean gas line, which is arranged, at least partly, within an outer contour of at least one filter device.

It may be advantageous if auxiliary filter material and/or a mixture of auxiliary filter material and overspray particles is loosened by means of at least one auxiliary filter material introduction mechanism, in particular by means of a treatment device for mechanically treating auxiliary filter material and/or a mixture of auxiliary filter material and overspray particles.

It may be favorable if at least a part of the raw gas flow is introduced into at least one auxiliary filter material receiving container of at least filter device.

Furthermore, it may be favorable if the loosened auxiliary filter material and/or the loosened mixture of auxiliary filter material and overspray particles is entrained by the raw gas flow and thereby mixes with the raw gas of the raw gas flow.

In particular when a loading of the raw gas from the raw gas flow with auxiliary filter material and/or with a mixture of auxiliary filter material and overspray particles already takes place by means of the introduction of the raw gas flow into the at least one auxiliary filter material receiving container of the at least one filter device, compressed air blasts by means of at least one compressed air device or similar devices to swirl the auxiliary filter material can be dispensed with.

In particular, it may be provided that the clean gas flow is guided through below a raw gas shaft of the painting installation. A particularly advantageous gas flow guidance within the filter system and a compact configuration of the filter system are thus possible.

Furthermore, the present invention relates to a method for operating a painting installation, which comprises the following method steps:

conveying the workpieces in a conveying direction through the painting booth by means of a conveying device and painting the workpieces in the painting booth;

feeding a raw gas flow from the painting booth of the painting installation, which has absorbed paint overspray in the painting booth, to a filter system;

separating paint overspray from the raw gas flow loaded with overspray particles by means of at least one filter device of the filter system, so that a clean gas flow is obtained.

The present invention is, in this regard, based on the object of providing a method by means of which paint overspray can be reliably separated from a raw gas flow loaded with paint overspray.

This object is achieved according to the invention in that the raw gas flow is guided by way of at least one inlet channel of at least one filter device into a raw gas chamber of the at least one filter device, auxiliary filter material being fed to the raw gas flow by means of at least one auxiliary filter material introduction mechanism.

The method according to the invention may preferably have the features and/or advantages described above in conjunction with the painting installation according to the invention and/or the method described above.

In particular, it can be provided that auxiliary filter material is swirled, mixed, conveyed and/or ground by means of the auxiliary filter material introduction mechanism.

Furthermore, the painting installations according to the invention and/or the methods according to the invention may have the following described features and/or advantages.

It may be advantageous if the painting installation comprises at least one auxiliary filter material introduction mechanism, which is configured as a dispensing mechanism for the specific feeding of auxiliary filter material, which is also called precoat material, to a raw gas flow loaded with overspray particles.

The filter system of the painting installation preferably comprises at least one clean gas chamber, which is separated by means of a filter element of at least one filter device from at least one raw gas chamber, a cleaned gas flow being present during the filter operation of the filter device in the at least one clean gas chamber and a gas flow loaded with overspray particles being present in the raw gas chamber.

The painting installation preferably has at least one gas return system, for example a circulating air guide device, by means of which the clean gas flow obtained by cleaning the raw gas flow is feedable again, at least partly, to the painting booth.

The painting installation preferably comprises at least one clean gas line, which is arranged, at least in portions, adjacent to the at least one filter device and/or is oriented substantially vertically, at least in portions. The clean gas adjacent to the at least one filter device is preferably guidable, at least in portions, substantially vertically downwardly by means of at least one clean gas line.

Furthermore, it can be provided that the painting installation comprises at least one clean gas line, which leads through below the (raw gas) shaft and therefore allows the guidance of the clean gas flow from the one side to the side opposing this side, with respect to a vertical longitudinal center plane of the painting booth.

Advantageously, the raw gas flow can be guided, in particular made to flow in, at an acute angle to the horizontal into at least one raw gas chamber of at least one filter device. It may be advantageous here if at least one, in particular movably configured, guide element (flow element) can be controlled and/or regulated in order to deflect the mean flow direction of the raw gas flow in the raw gas shaft asymmetrically with respect to the longitudinal center plane of the painting booth and/or the longitudinal center plane of the filter system (of the air cleaning system) and feed it to the raw gas chamber, preferably in an accelerated manner. In particular, it may be provided that the mean flow direction of the raw gas flow in an entry region of the raw gas shaft at the upper end of the raw gas shaft is transverse to the mean flow direction of the raw gas flow in an inlet channel of the filter device. The mean flow direction of the raw gas flow in the inlet channel of the filter device furthermore preferably runs transverse to the vertical longitudinal center plane of the painting booth.

It may be advantageous if, in at least one raw gas chamber of at least one filter device of the filter system, with the aid of the raw gas flow and/or with the aid of a treatment device, for example a rotating mixing unit (paddle mixer, screw mixer), auxiliary filter material, which, for example, is arranged in an auxiliary filter material receiving container configured as a trough, can be swirled and fed (metered) to the raw gas flow. The raw gas flow thus loaded with auxiliary filter material is preferably deflected and fed with a vertically upwardly directed flow component to at least one filter element of at least one filter device.

It may be advantageous if the clean gas line leading through under the raw gas shaft runs substantially transverse to the conveying direction of the conveying device of the painting installation and opens into a clean gas collecting channel, which is also a component of the gas return system, in particular of the circulating air guidance device, and from which clean gas can be removed for feeding to the painting booth.

The auxiliary filter material introduction mechanism configured, for example, as a mixing unit, preferably has a rotational axis oriented substantially horizontally, about which at least one treatment element can rotate, and allows the conveyance of auxiliary filter material in a direction oriented substantially parallel to the conveying direction of the conveying device of the painting installation. It may be provided here that a feeding of the raw gas flow takes place in a direction running transverse to the rotational axis of the auxiliary filter material introduction mechanism, in particular substantially perpendicular thereto and that the clean gas line leading through below the raw gas shaft also runs, at least partly, below, in particular under, the filter device and/or below, in particular under, the auxiliary filter material introduction mechanism.

The filter system of the painting installation preferably allows a pressure build up by means of at least one fan within a filter module.

In particular, when at least one auxiliary filter material introduction mechanism is configured as a treatment device, it may be provided, by means of at least one treatment element of the treatment device, that an outlet arranged adjacent to the auxiliary filter material introduction mechanism can be cleared to remove auxiliary filter material from the filter device by means of the at least one treatment element, so that this outlet cannot clog and does not prevent the discharge of auxiliary filter material, in particular highly loaded with overspray particles.

In one configuration of the invention, it may be provided that at least one auxiliary filter material introduction mechanism comprises at least one grinding ball and/or at least one grinding plate, by means of which, in particular, agglomerates of auxiliary filter material and overspray particles can be broken up.

It may be advantageous if an outlet in the filter device to remove auxiliary filter material from the filter device is provided with a safety device, for example with bars arranged in a cross-shape, in order to prevent a blocking of the outlet with large agglomerates of auxiliary filter material and overspray particles.

In one configuration of the invention it is provided that at least one treatment device comprises various treatment elements, for example loosening elements, conveying elements, grinding elements and/or mixing elements.

In particular, it may be provided that at least one treatment element of at least one treatment device surrounds a predetermined volume at least on five sides and auxiliary filter material can be received therein during treatment operation, so that during treatment operation of the treatment device, in which auxiliary filter material, for example, can be swirled, a certain quantity of auxiliary filter material can be captured by the at least one treatment element, without this auxiliary filter material immediately sliding off the at least one treatment element again.

At least one treatment device preferably comprises a grinder, grinding stone and/or grinding balls, which are formed, for example, from ceramic.

In one configuration of a treatment device, it is provided that at least one grinding ball is configured as a freely rolling ball made of a high-density material, for example, metallic material, in particular of steel.

It may be advantageous if at least one treatment device comprises a grinder with grinding stones rubbing on one another.

Furthermore, it may be advantageous if at least one treatment device comprises a rotating screw conveyor.

In one configuration of the invention it may be provided that the weight or the mass of the auxiliary filter material arranged in the auxiliary filter material receiving container or the mixture of auxiliary filter material and paint overspray arranged in the auxiliary filter material receiving container is determined by means of a weighing device.

In this case, the weighing device may, in particular, be coupled to a lower portion of the auxiliary filter material receiving container, which is mechanically decoupled from an upper portion of the auxiliary filter material receiving container.

Furthermore, the weight or the mass of the lower portion of the auxiliary filter material receiving container and the material contained therein is preferably determined by means of the weighing device.

In order to be able to assess the usability of the material contained in the auxiliary filter material receiving container to clean the raw gas flow, it may be provided that material from the auxiliary filter material receiving container is loosened and/or swirled in at least one swirling phase and a cleaning capacity or efficiency of the material contained in the auxiliary filter material receiving container is determined by a comparison of the weight or the mass of the material contained in the auxiliary filter material receiving container before the swirling phase and after the swirling phase. In particular, the quantity of auxiliary filter material adhering to at least one filter element of the filter device during the swirling phase can be determined by this in order to form a protective layer thereon.

The efficiency (specific absorption capacity) is a measure of the ability of the auxiliary filter material to adhere to the filter element and be able to bind the paint overspray.

An efficiency of this type may, in particular, be determined as a quotient of the reduction in the weight or the mass of the material contained in the auxiliary filter material receiving container by the swirling, on the one hand, and the net swirling time, on the other hand.

For a more precise determination of the effectiveness, it may be provided that a swirling cycle is carried out with a plurality of swirling phases separated from one another by swirling breaks and the weight or the mass of the material contained in each case in the auxiliary filter material receiving container before the first swirling phase of the swirling cycle and after the last swirling phase of the swirling cycle is compared to determine the effectiveness. The greater the value of this effectiveness, the more suitable is the material from the auxiliary filter material receiving container to form a protective layer on the at least one filter element.

It is therefore favorable if material is removed from the auxiliary filter material receiving container when the determined efficiency and/or the weight or mass difference falls below a predetermined minimum value.

The material removed, in particular a mixture of auxiliary filter material and paint overspray, is then preferably replaced by fresh auxiliary filter material, which is not, or only to a small extent, loaded with paint overspray.

In a preferred configuration, it may be provided that an amplitude of a weight curve is determined by means of a weighing device, said weight curve representing the time course of the total weight of the mixture of auxiliary filter material and overspray particles arranged in the auxiliary filter material receiving container.

It may, for example, be provided when a predetermined limit weight is fallen below and/or exceeded, that at least a part of the mixture of auxiliary filter material and overspray particles is removed from the auxiliary filter material receiving container and replaced by fresh auxiliary filter material, which is not, or only to a small extent, loaded with overspray particles.

A high degree of efficiency of the auxiliary filter material over a long period can thus be maintained.

In particular, by means of an auxiliary filter material introduction mechanism, a continuous pre-coating, in other words a continuous introduction of auxiliary filter material into the raw gas flow during filter operation of at least one filter device, can be realized.

A compressed air device for mixing, loosening and/or swirling auxiliary filter material is preferably dispensable.

In an alternative embodiment or in addition to an auxiliary filter material introduction mechanism as described above, a compressed air device may be provided for mixing, loosening and/or swirling auxiliary filter material.

A continuous addition of auxiliary filter material to the raw gas flow from a storage tank (auxiliary filter material receiving container) preferably takes place. This produces a (short-term) continuous loss of mass between two cleaning processes on the filter cartridges (filter elements). In the medium term, an increase in the mass of auxiliary filter material and overspray particles is produced in the auxiliary filter material receiving container and there is also a decrease again from a specific instant. The mass of auxiliary filter material and overspray particles in the auxiliary filter material receiving container is preferably monitored continuously for this. In particular, the development of the mass of auxiliary filter material and overspray particles in the auxiliary filter material receiving container is compared at fixed time intervals with a reference value, for example a reference value for unused auxiliary filter material, in other words auxiliary filter material not contaminated with paint overspray particles.

It can preferably be determined whether a mixture of auxiliary filter material and paint overspray arranged in the auxiliary filter material receiving container is capable of fluidizing. For this purpose, for example, the development with respect to time of the total mass of auxiliary filter material and paint overspray present in the auxiliary filter material receiving container can be determined and compared with reference values, wherein it must be possible to detect, in particular, a mass change in the auxiliary filter material receiving container occurring within a cleaning and swirling cycle in order to be able to infer the ability of the mixture of auxiliary filter material and paint overspray to fluidize. Too low a mass difference in the course of a cycle of this type means that the quantity of auxiliary filter material necessary for reliable filter operation of the filter device is not capable of fluidizing.

By means of at least one treatment device, the auxiliary filter material arranged in the auxiliary filter material receiving container or the mixture of auxiliary filter material and overspray particles arranged in the auxiliary filter material receiving container can be kept in a loosened state, for example fluidized, so that the auxiliary filter material or the mixture of auxiliary filter material and overspray particles can be swirled particularly easily and fed to the raw gas flow.

Furthermore, the auxiliary filter material arranged in the auxiliary filter material receiving container or the mixture of auxiliary filter material and overspray particles arranged in the auxiliary filter material receiving container can be thrown up by means of at least one treatment device, in particular continuously, so that it can be entrained particularly easily by the raw gas flow and therefore picked up by the raw gas flow.

An electric motor may be provided, for example, to drive at least one treatment device. A rotational speed of a rotating (treatment) element of at least one treatment device can, in particular, be controlled and/or regulated particularly easily in this manner.

An introduction capacity, in particular, can be influenced by controlling and/or regulating a rotational speed (frequency) of at least one treatment device.

At least one flow guidance device and/or at least one inlet channel of at least one filter device is preferably arranged in such a way that a raw gas flow guided into the raw gas chamber in the region of the treatment device, in particular just above the treatment device, flows into the raw gas chamber, so that already a small throwing height of the treatment device is sufficient to feed auxiliary filter material to the raw gas flow, in other words, even when the material arranged in the auxiliary filter material receiving container is conveyed by the at least one treatment device vertically upwardly over a small distance, the auxiliary filter material or the mixture of auxiliary filter material and overspray particles can be picked up by the raw gas flow.

In particular when at least one treatment device comprises a grinding device for grinding the material (auxiliary filter material or a mixture of auxiliary filter material and overspray particles) arranged in the auxiliary filter material receiving container, agglomerates of overspray particles and auxiliary filter material can be pulverized particularly easily so that a constant grain size distribution can be ensured.

Alternatively or in addition to this, it may be provided that at least one auxiliary filter material introduction mechanism comprises an acoustic device, for example an ultrasonic device, by means of which the mixture of overspray particles and auxiliary filter material can be acted upon by sound, so that agglomerates of overspray particles and auxiliary filter material can be comminuted.

At least one treatment element of at least one treatment device preferably comprises a metallic material or is preferably formed from a metallic material in order to minimize the abrasion during continuous operation. As an alternative or in addition to this, it may, however, also be provided that at least one treatment element of at least one treatment device comprises a plastics material, for example a fiber-reinforced plastics material, and/or a ceramic material or is formed from a plastics material, for example a fiber-reinforced plastics material or from a ceramic material.

In particular when non-metallic materials are selected for the treatment elements of at least one treatment device, higher rotational speeds can be achieved, without a spark formation having to be feared.

It may be advantageous if at least one auxiliary filter material introduction mechanism is provided by means of a safety device configured, for example, as a coarse separator, in particular as a grid, as a magnetic matrix or as a comb, in order to catch items inadvertently sucked into the filter device, in particular metallic items. In particular, a treatment device can thereby be protected from damage.

In particular when the efficiency (specific absorption capacity) of the mixture of auxiliary filter material and overspray particles arranged in the auxiliary filter material receiving container reduces in the course of a filter operation of the at least one filter device, it may be provided that a partial emptying of the at least one auxiliary filter material receiving container is carried out and very fine auxiliary filter material is fed in. For example, auxiliary filter material with a grain size distribution is fed, which has a median $D_{50}$ of about 1 μm to about 10 μm, in other words 50% of the particles are greater and 50% of the particles are smaller than the predetermined value between about 1 μm and about 10 μm.

It may furthermore be provided that material from a silo, in which auxiliary filter material loaded with overspray particles and discharged from the auxiliary filter material receiving container can be stored, is mixed with fresh auxiliary filter material not loaded with overspray particles and fed again to the auxiliary filter material receiving container. It may furthermore be provided here that the mixture of fresh auxiliary filter material and auxiliary filter material loaded with overspray particles is processed, for example ground, before it is fed to the auxiliary filter material receiving container.

It may be provided in the painting installation according to the invention and/or in the method according to the invention that a filter area at least of one filter device is extended by adding further filter elements, so that preferably only one row of filter devices extending along the conveying direction of the conveying device of the painting installation is provided and the total air coming from the painting booth, in other words the total raw gas flow, is fed to this row of filter devices.

The painting installation preferably comprises at least one clean gas collecting channel constructed "in two stories", the two "stories" preferably being connected to one another by means of at least one fan, which, for example, is configured as an axial fan and is arranged in the intermediate floor separating the two "stories".

The air (clean gas) collected in the clean gas collecting channel is preferably guided parallel to the conveying direction of the conveying device of the painting installation to an end face of the painting installation and guided at least approximately perpendicularly upwardly to a plenum of the painting installation in the region of a sluice of the painting booth. A channel of this type for feeding the clean gas collected by means of the clean gas collecting channel to the plenum may, for example, be provided after four or more respective filter devices.

At least one filter device preferably comprises at least one, for example vertically suspended, filter element, which is arranged within a vertical projection of the painting booth under the painting booth and can be disassembled from the filter device.

It is provided in one configuration of the painting installation that the painting installation comprises at least one compressed air tank, which, for example, is arranged above, in particular over, at least one filter device.

It may be advantageous if various clean gas lines, which feed clean gas from various filter devices to a clean gas collecting channel, are provided with different conditioning devices. Thus, for example, it may be provided that at least one clean gas line of at least one filter device is provided with a conditioning device configured as a cooling device and that at least one further clean gas line of another filter device is provided with a conditioning device configured as a dehumidifying device. The necessary heat to operate the painting installation, of the gas flow to be fed to the painting booth is preferably fed to said gas flow by means of at least one fan, in other words this heat preferably comes from the compressive heat of the at least one fan.

In particular, when various conditioning devices are provided in various clean gas lines, it may be provided that the required temperature and/or air humidity of the gas flow to be fed to the painting booth is obtained by mixing differently conditioned clean gas flows coming from different clean gas lines.

At least one filter device preferably comprises at least one funnel.

At least one filter device is advantageously configured to be walked on, in other words a person can enter an interior of the at least one filter device.

It may be favorable if at least one filter device can be supplied with auxiliary filter material (for example rock flour) and/or auxiliary filter material can be disposed of from the filter device.

Basically, a 2.5 m module may be provided as the filter device, which allows a volume flow of, for example, between about 15,000 m$^3$/h and about 30,000 m$^3$/h. In particular, it may be provided that, at a pressure of 1,200 Pa, a volume flow of, for example, about 22,000 m$^3$/h is realizable and a volume flow of, for example, about 20,000 m$^3$/h is realizable at about 1,000 Pa. This corresponds to substantially twice the volume flow of the previously known 2 m module.

Further features and/or advantages of the invention are the subject of the following description and the graphical view of embodiments.

BRIEF DESCRIPTION OF THE DRAWINGS

The same or functionally equivalent elements are provided with the same reference numerals in all the figures.

DETAILED DESCRIPTION OF THE DRAWINGS

A painting installation designated 100 as a whole and shown in FIGS. 1 to 10 comprises a painting booth 102, in which workpieces 104 are paintable, for example, with fluid paint, in particular with wet paint, and a filter system 106, with which an air flow guided through the painting booth 102 can be cleaned.

Figure 4:
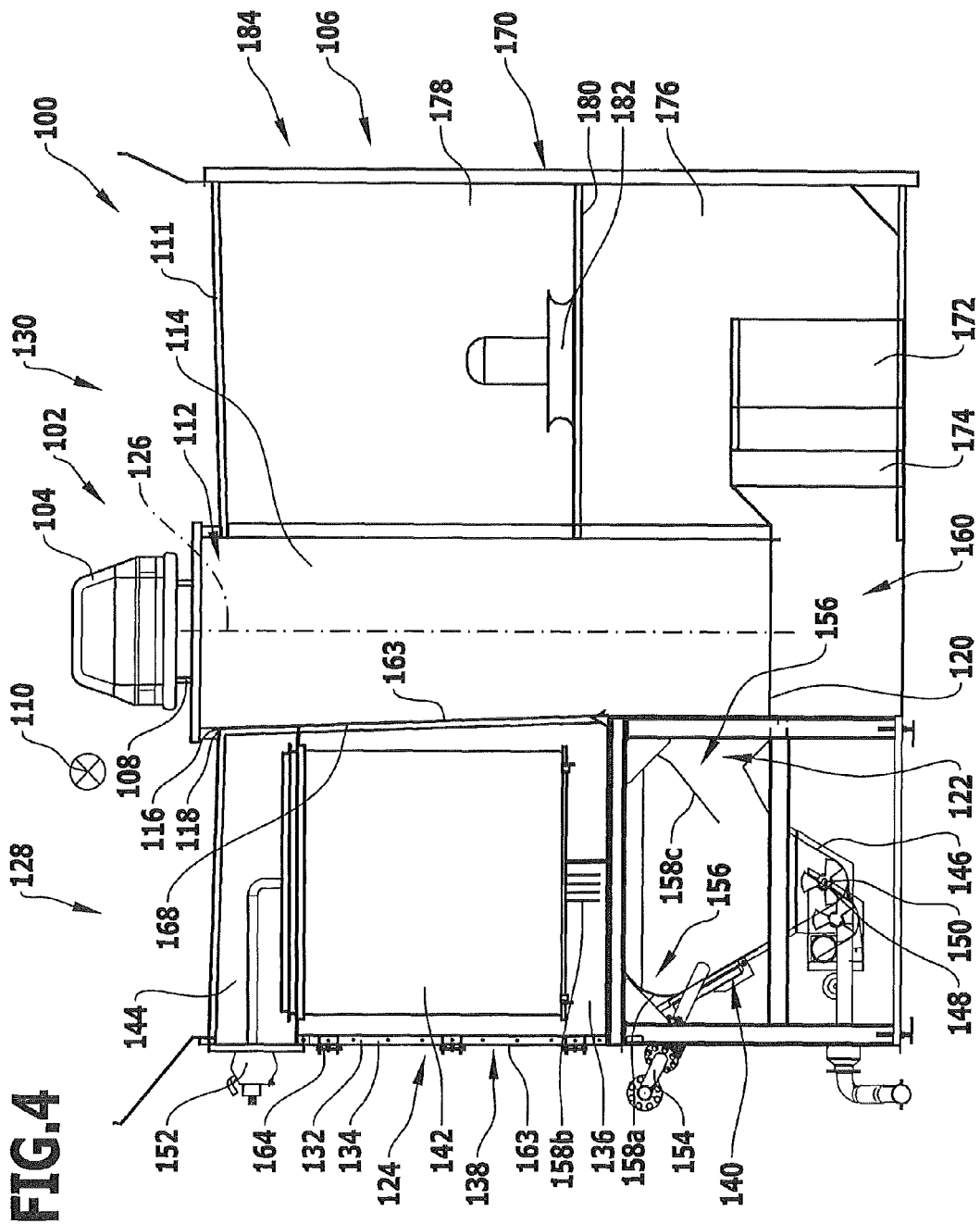
FIG. 4 shows a schematic vertical cross-section through the painting installation from FIG. 1.
Figure 5:
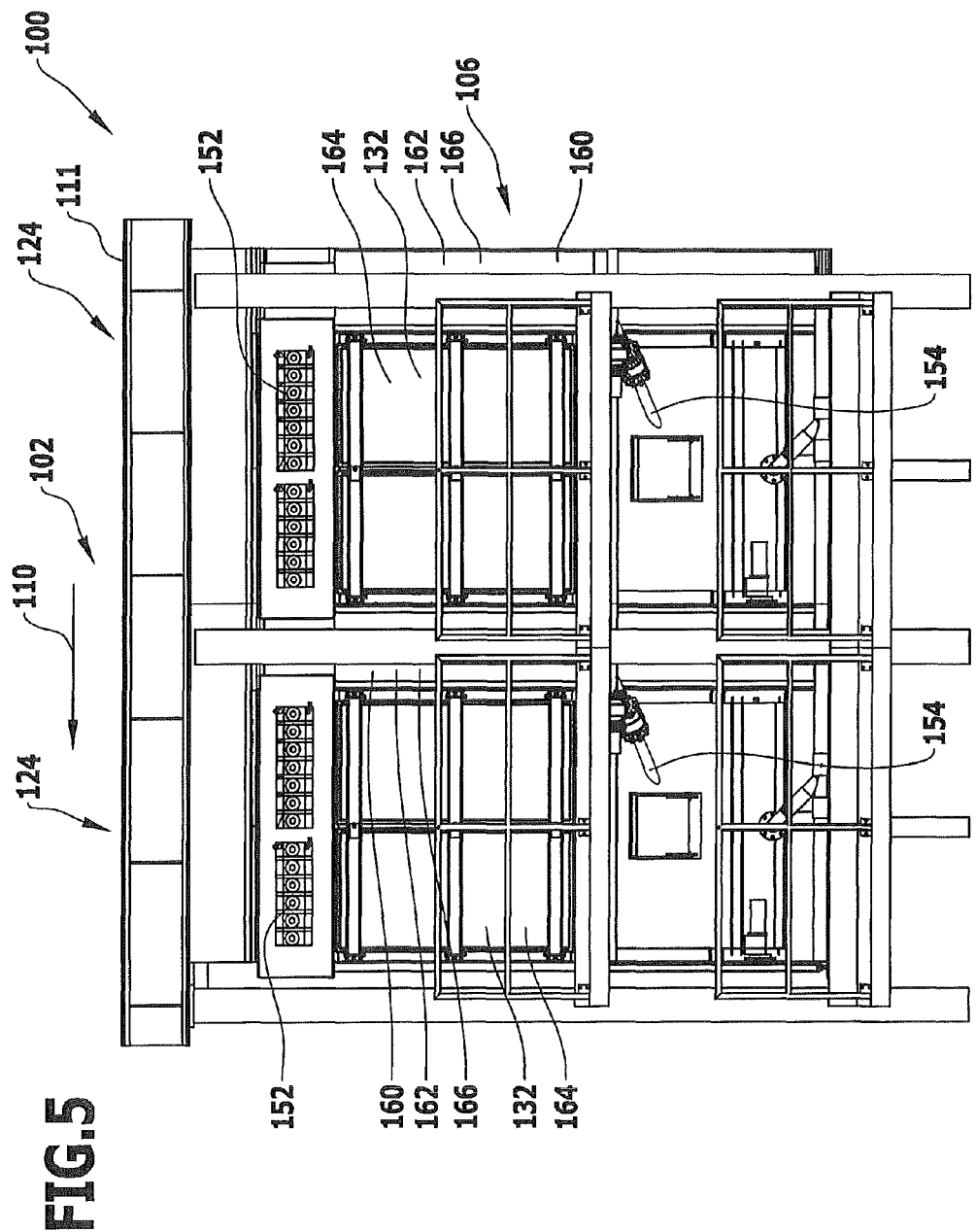
FIG. 5 shows a schematic plan view of the maintenance side of the painting installation from FIG. 1.

The painting booth 102 comprises a conveying device 108, by means of which the workpieces 104, for example vehicle bodies, can be conveyed in a conveying direction 110 thorough the painting booth 102 (see, in particular, FIG. 4).

During the painting of workpieces 104 in the painting booth 102, overspray is produced, for example, when using wet paint, wet paint overspray, which is absorbed by the air guided through the painting booth 102 and therefore contaminates it.

The filter system 106, by means of which the overspray can be removed from the air guided through the painting booth 102, is therefore arranged under the painting booth 102 of the painting installation 100.

Reference will be made below to the air loaded with overspray particles and guided through the painting booth 102 as the raw gas flow.

In order to be able to feed the raw gas flow from the painting booth 102 to the filter system 106, a painting booth base 111 of the painting booth 102 is provided with an opening 112 extending in the conveying direction 110, which is arranged centrally in the painting booth base 111 with respect to a horizontal direction extending perpendicular to the conveying direction 110.

A substantially cuboidal raw gas shaft 114 of the filter system 106 is arranged under the opening 112.

The raw gas shaft 114 of the filter system 106 extends in the conveying direction 110 and in the vertical direction and is arranged substantially centrally in the filter system 106 with respect to a direction running horizontally and perpendicularly to the conveying direction 110.

An upper end 116, in the vertical direction, of the raw gas shaft 114 faces the opening 112 of the painting booth 102 and forms an inflow opening 118 of the raw gas shaft 114, through which the raw gas flow can enter the raw gas shaft 114.

An end 120 of the raw gas shaft 114, which is the lower end in the vertical direction and arranged opposing the upper end 116, adjoins a plurality of inlet channels 122 of a plurality of regenerable filter devices 124, so that the raw gas flow is feedable by means of the raw gas shaft 114 to the filter devices 124.

As can be derived, in particular from FIG. 4, the filter system 106 can be divided by means of a vertical longitudinal center plane 126 of the painting booth 102 into a left-hand side 128 with respect to the conveying direction 110 of the conveying device 108 of the painting booth 102 and a right-hand side 130 arranged opposite the left-hand side 128 with respect to the vertical longitudinal center plane 126 of the painting booth 102.

Arranged on the left-hand side 128 of the filter system 106 is a row of filter devices 124, which are arranged one behind the other in the conveying direction 110 and, in each case, have an inlet channel 122 adjoining the lower end 120 of the raw gas shaft 114.

Each of the filter devices 124 is substantially cuboidal here and comprises a housing 134, which is formed by delimiting walls 132 inclined at an angle of preferably at least about 80° with respect to the horizontal. The delimiting walls 132 delimit a raw gas chamber 136.

The housing 134 of each filter device 124 can be divided into a filter portion 138 and a funnel portion 140.

The filter portion 138 is substantially cuboidal and is used to receive a plurality of filter elements 142.

The funnel portion 140 arranged below the filter portion 138 has a substantially triangular cross-section and is used to feed the raw gas flow to the filter elements 142 and to enrich the raw gas flow with auxiliary filter material.

A clean gas chamber 142, which is separated by means of the filter elements 142 from the raw gas chamber 136, is arranged above the filter elements 142 of the filter device 124.

The filter device 124 furthermore comprises an auxiliary filter material receiving container 146, which is arranged at a lower end of the funnel portion 140 and is used to receive auxiliary filter material.

An auxiliary filter material introduction mechanism 148, by means of which auxiliary filter material can be introduced into the raw gas flow flowing in through the inlet channel 122, is arranged in the auxiliary filter material receiving container 146.

The auxiliary filter material introduction mechanism 148 is, for example, configured as a treatment device 150 for the mechanical treatment of the auxiliary filter material arranged in the auxiliary filter material receiving container 146 or a mixture of auxiliary filter material and overspray particles arranged in the auxiliary filter material receiving container 146.

Auxiliary filter material can be swirled in the raw gas chamber 136 by means of the auxiliary filter material introduction mechanism 148 and deposited on the filter elements 142, whereby a protective layer is formed on the filter elements 142.

In order to remove the protective layer of auxiliary filter material from the filter elements 142, a compressed air device 152 is provided in the clean gas chamber 144, by means of which device compressed air is feedable to the filter elements 142.

The compressed air is feedable, in this case, by means of the compressed air device 152 to the filter elements 142 in a direction, which is opposed to the flow direction of the gas to be cleaned in a filter operation of the filter device 124, so a protective layer of auxiliary filter material can be removed particularly easily from the filter elements 142 by means of the compressed air device 152.

In particular, to be able to feed fresh auxiliary filter material to the funnel portion 140 of the filter device 124, a feed device 154 is provided in the region of the funnel portion 140 of the filter device 124.

The inlet channel 122, through which the raw gas flow is feedable to the raw gas chamber 136 of the filter device 124, is provided with a flow guidance device 156, which has at least one flow element 158 and is used to influence the flow direction and/or the flow speed of the raw gas flow guided through the inlet channel 122 of the filter device 124.

Furthermore, provided in the raw gas chamber 136 is a further flow guidance device 156, which comprises a flow element 158a configured as a guide plate and a plurality of, for example four, rod-shaped flow elements 158b (see FIG. 4), which are used for turbulence formation and the specific feeding of the raw gas flow to the filter elements 142.

By cleaning the raw gas flow by means of the filter devices 124, a clean gas flow can be obtained, which firstly flows through the clean gas chamber 144.

A clean gas line 160, by means of which the clean gas flow from the clean gas chamber 144 adjacent to the filter device 124 can be guided vertically downwardly, adjoins the clean gas chamber 144. Basically, a separate clean gas line 160 can be provided for each filter device 124. However, it may be advantageous if the cleaned gas flow is discharged from two filter devices 124, in particular between the two filter devices 124, by means of a common clean gas line 160.

The clean gas line 160, for this purpose, comprises delimiting walls 162, which are substantially aligned with the delimiting walls 132 of the filter device 124, which run at least approximately parallel to the vertical longitudinal center plane 126 of the painting booth 102. The clean gas line 160 therefore does not project beyond the filter device 124 in the horizontal direction and perpendicular to the conveying direction 110 in this portion and is therefore arranged within an outer contour 163 of the filter device 124.

In particular, it is provided here that an outer delimiting wall 164 of the filter device 124 remote from the vertical longitudinal center plane 126 of the painting booth 102 is arranged spaced apart at least to precisely the same extent from the vertical longitudinal center plane 126 of the painting booth 102 as an outer delimiting wall 166 of the clean gas line 160 remote from the vertical longitudinal center plane 126 of the painting booth 102.

The delimiting walls 132, 162 of the filter device 124 or the clean gas line 160, which face the longitudinal center plane 126 of the painting booth 102, preferably align with one another in such a way that a substantially level delimiting wall 168 of the raw gas shaft 114 is formed by these delimiting walls 132, 162.

The clean gas line 160 extends through from the clean gas chamber 144 to below the funnel portion 140 of the filter device 124 and proceeding from there substantially perpendicular to the conveying direction 110 in the horizontal direction below the raw gas shaft 114 to the right-hand side 130 of the filter system 106 opposing the left-hand side 128 of the filter system 106.

A clean gas collecting channel 170, into which the clean gas line 160 opens, is arranged on this right-hand side 130 of the filter system 106.

At least one conditioning device 172, which, for example, is configured as a heating device, as a cooling device, as a humidifying device and/or as a dehumidifying device, can be provided in the clean gas line 160 to condition the clean gas flow guided in the clean gas line 160.

Arranged before, in other words upstream, of the conditioning device 172 with respect to the flow direction of the clean gas flow is a safety filter 174, which, in the case of undesired damage to a filter element 142 of a filter device 124, can prevent auxiliary filter material reaching the conditioning device 172 and thus damaging it.

The clean gas flow conditioned by means of the conditioning device 172 is then fed to a mouth region 176 of the clean gas collecting channel 170, into which open a plurality of clean gas lines 160 of the various filter devices 124.

The clean gas collecting channel 170, apart from the mouth region 176, comprises a discharge region 178, by means of which the cleaned and conditioned gas flow can be discharged from the filter system 106 for reuse in the painting booth 102.

The clean gas collecting channel 170 is therefore divided into two parts, the mouth region 176 being arranged under the discharge region 178 and being separated by means of a partition wall 180 extending along a horizontal plane from the latter.

Arranged in the partition wall 180 are a plurality of fans 182, by means of which the clean gas can be moved out of the mouth region 176 into the discharge region 178 of the clean gas collecting channel 170 and which therefore also drive, as a whole, the clean gas flow and/or the raw gas flow in the painting installation 100.

Figure 1:
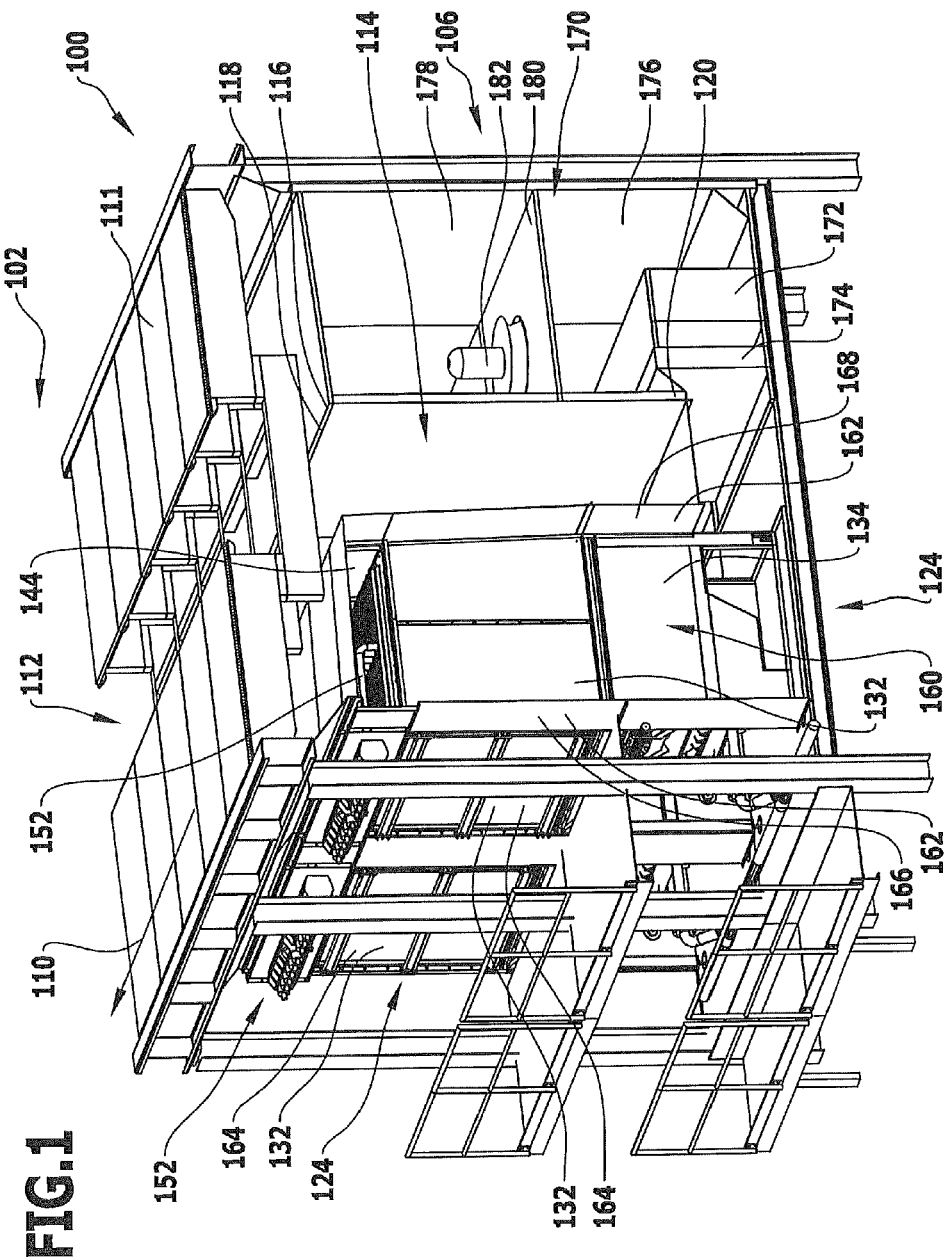
FIG. 1 shows a schematic perspective view of a painting installation, with a view of a maintenance side of the painting installation.
Figure 2:
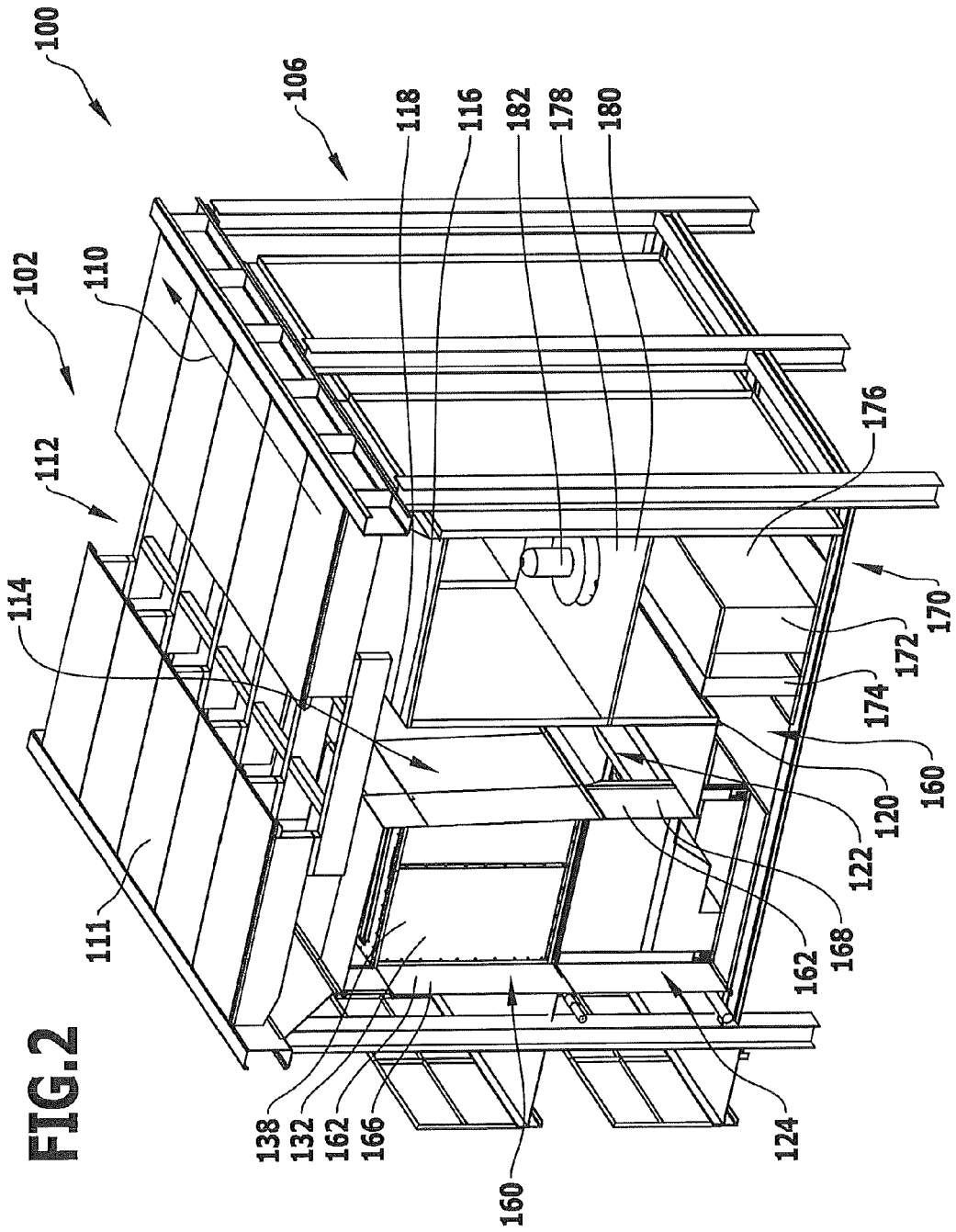
FIG. 2 shows a schematic perspective view of the painting installation from FIG. 1, with a view of a rear side of the painting installation opposing the maintenance side of the painting installation.
Figure 3:
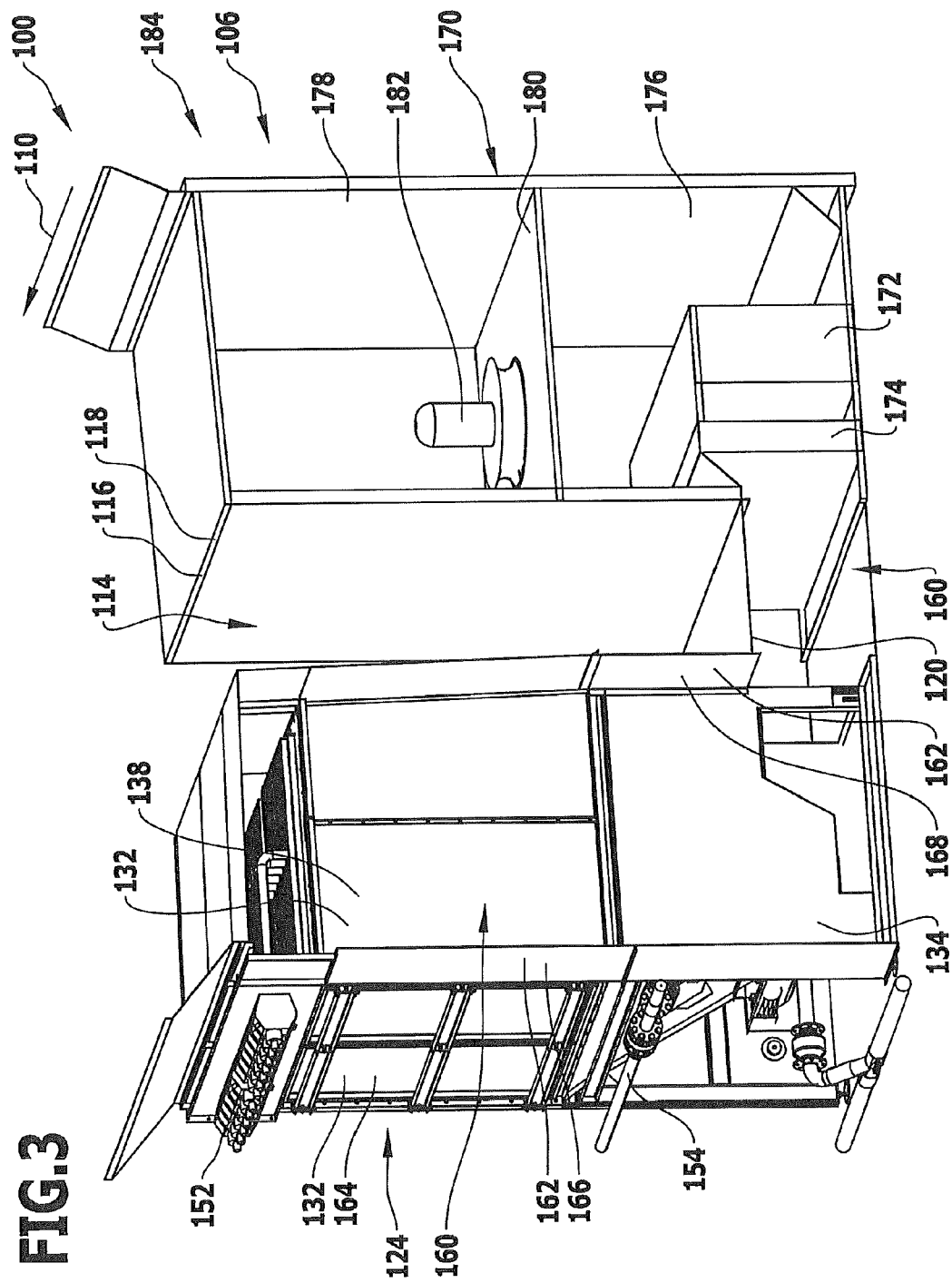
FIG. 3 shows a schematic perspective view of a filter module of a filter system of the painting installation from FIG. 1.

As can be derived, in particular from FIG. 3, it may be provided that the filter device 124, the clean gas line 160, a portion of the clean gas collecting channel 170, the conditioning device 172, the safety filter 174 and a portion of the raw gas shaft 140 together form a filter module 184.

A filter module 184 is, in this case, in particular, a preassembled unit, which can be assembled separately from an erection site of the painting installation 100 and only has to be connected to other components, in particular to further, in particular identically formed, filter modules 184, to complete the painting installation 100.

Figure 6:
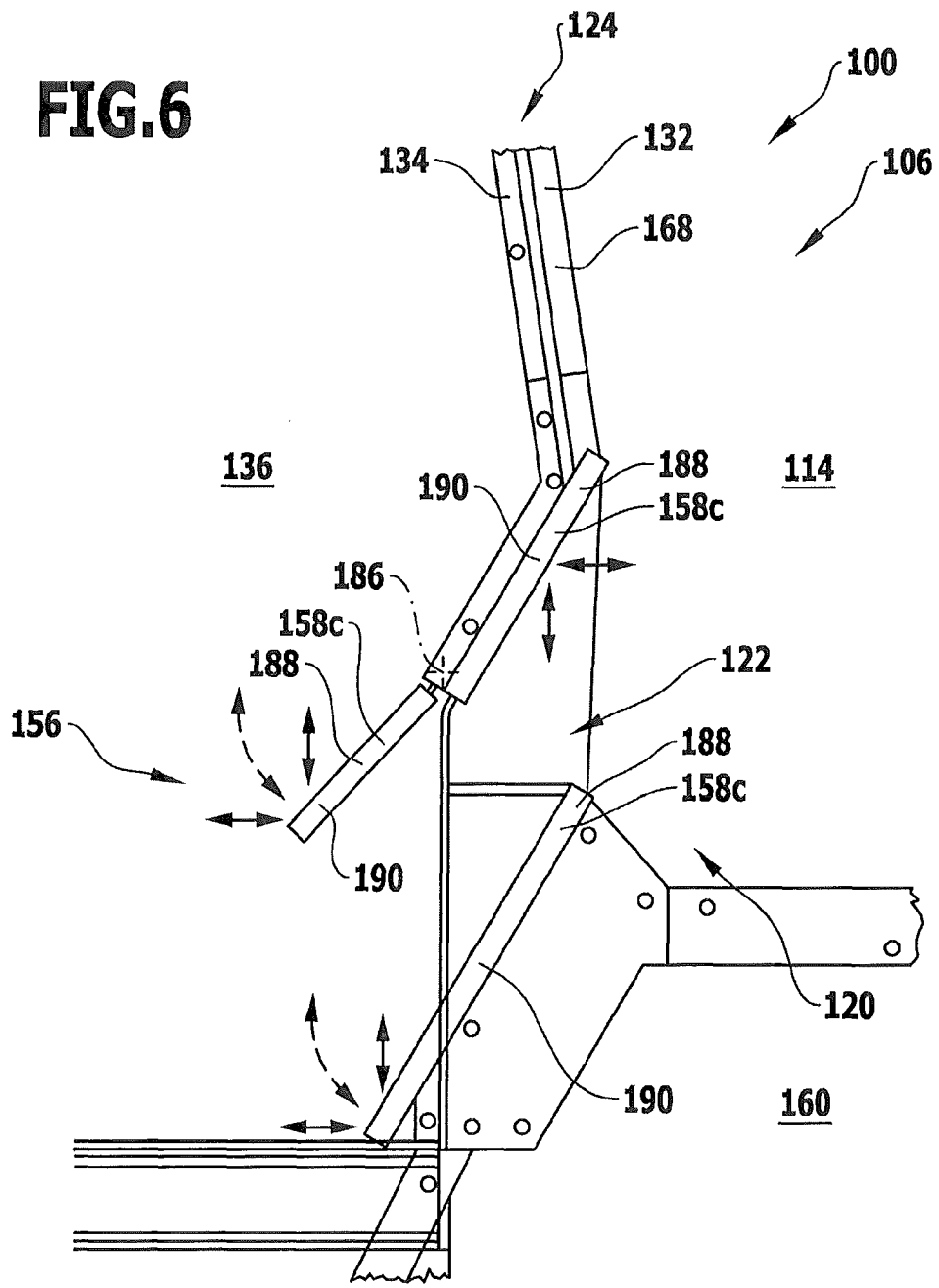
FIG. 6 shows a schematic sectional view of an inlet channel of a filter device of the filter system of the painting installation from FIG. 1.
Figure 7:
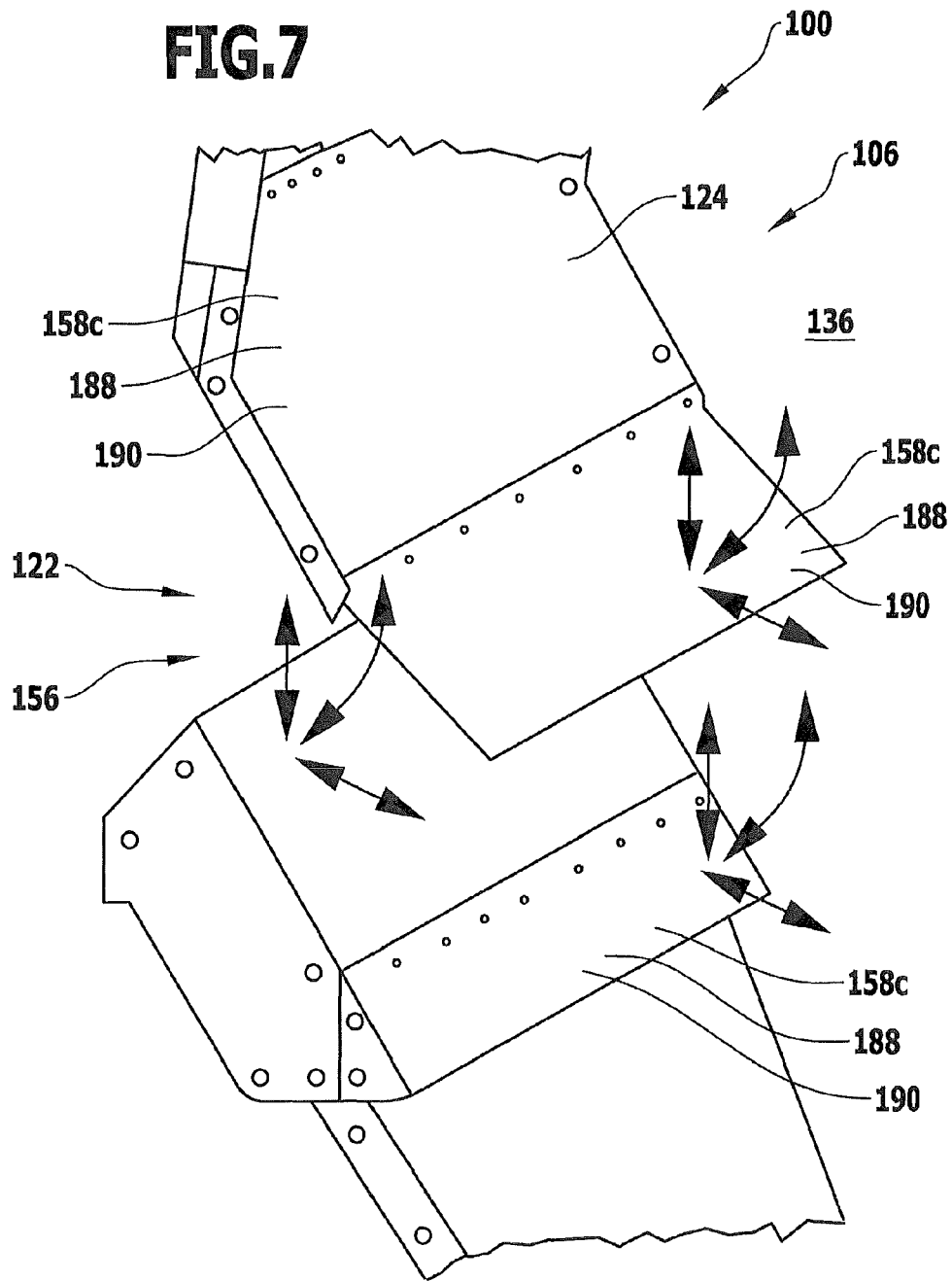
FIG. 7 shows a schematic perspective view of the inlet channel from FIG. 6.

As can be derived in particular from FIGS. 6 and 7, the flow guidance device 156, in the region of the inlet channel 122 of the filter device 124, comprises, for example, three flow elements 158c, by means of which the direction and/or the speed of the raw gas flow to be fed by way of the raw gas shaft 114 to the raw gas chamber 136 can be controlled and/or regulated.

The flow elements 158c are movable, for this purpose, in the horizontal and/or vertical direction and/or rotatable about a rotational axis 186.

In the embodiment of the flow guidance device 156 shown in FIGS. 6 and 7, the flow elements 158c are configured, in the region of the inlet channel 122, as guide plates 188 and form delimiting walls 190 of the inlet channel 122.

A cross-section of the inlet channel 122 may thus be varied, in particular by a movement of the flow elements 158c relative to one another, so the speed of the raw gas flow guided through the inlet channel 122 can be adjusted, in particular.

Furthermore, an adjustment can be made by means of the flow elements 158c regarding at which point the raw gas flow is guided into the raw gas chamber 136 and how deeply the gas flow enters the funnel portion 140 of the filter device 124. It can thus also be adjusted to what extent auxiliary filter material from the auxiliary filter material receiving container 146 is swirled by the raw gas flow and entrained by the raw gas flow.

By changing the angle, which the flow elements 158c enclose with one another and/or with the further delimiting walls 190 of the inlet channel 122 and/or with delimiting walls 132 of the filter device 124 and/or with delimiting walls 168 of the raw gas shaft 114, the development of return flows during filter operation of the filter device 124 along the flow elements 158c can be prevented or promoted.

Return flows may be used to accumulate auxiliary filter material on at least one of the flow elements 158c up to a break-off edge, in order to protect at least this flow element 158c from contamination with overspray particles. Preventing the return flow, on the other hand, may be favorable for maintenance operation of the filter device 124, since, as a result, an automatic cleaning off of adhering auxiliary filter material can take place, without a manual cleaning having to be carried out.

A change in the position and/or orientation of at least one flow element 158c, which then forms a variable flow element 158c, can, for example, take place by means of a drive device (not shown), for example by means of an electric motor. Furthermore, it may be provided that at least one flow element 158c can be lengthened and/or shortened, for example by a motor.

At least one of the flow elements 158c configured as guide plates 188 are preferably configured in such a way that the inlet channel 122 of the filter device 124 can optionally be completely closed. In this manner, in particular a return flow of auxiliary filter material into the raw gas shaft 114 and then into the painting booth 102 can be, in particular, prevented.

Furthermore, an undesired penetration of cleaning agents and/or other fluids into the raw gas chamber 136 of the filter device 124 can thus be prevented, which, for example, may be advantageous during a wet cleaning operation of the painting booth 102 or in the event of a sprinkler being triggered in the event of a fire.

In particular, a horizontal displacement of at least one flow element 158 is preferably carried out independently of the remaining components of the filter device 124.

In this manner, for example by means of a flow element 158 arranged offset with respect to the funnel portion 140 of the filter device 124, it can be brought about that the raw gas flow does not flow along the delimiting wall 132 of the funnel portion 140 of the filter device 124, but directly into the center of the auxiliary filter material receiving container 146, in particular directly into the center of the auxiliary filter material introduction mechanism 148, so that a particularly large amount of auxiliary filter material is received and can be transported to the filter elements 142 of the filter device 124.

Figure 8:
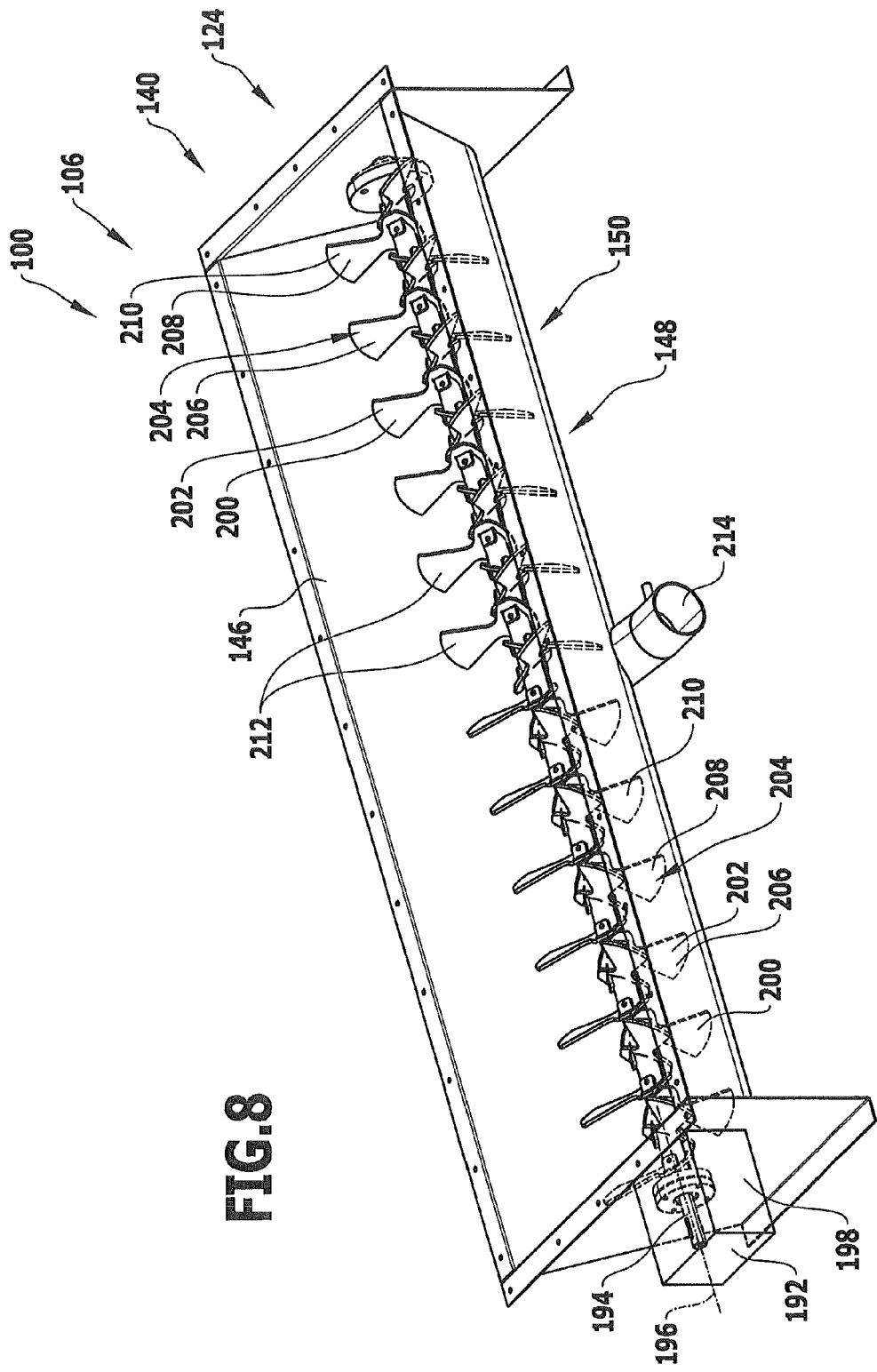
FIG. 8 shows a schematic perspective view of an auxiliary filter material introduction mechanism of a filter device of the filter system of the painting installation from FIG. 1.

FIG. 8 shows an enlarged perspective view of the auxiliary filter material receiving container 146 and the auxiliary filter material introduction mechanism 148, arranged therein, of the painting installation 100.

Figure 9:
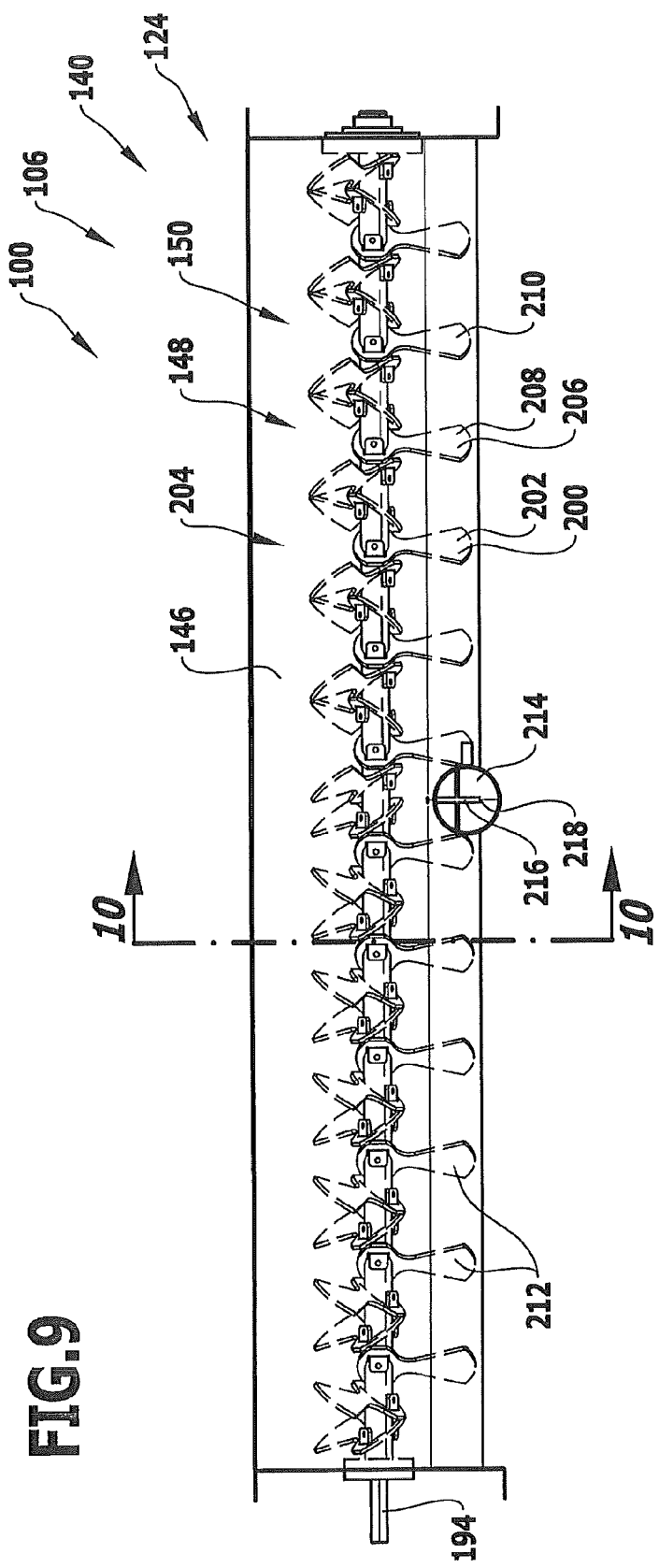
FIG. 9 shows a schematic side view of the auxiliary filter material introduction mechanism from FIG. 8, with a view of the side of the auxiliary filter material introduction mechanism facing the maintenance side of the painting installation in the assembled state of the auxiliary filter material introduction mechanism.
Figure 10:
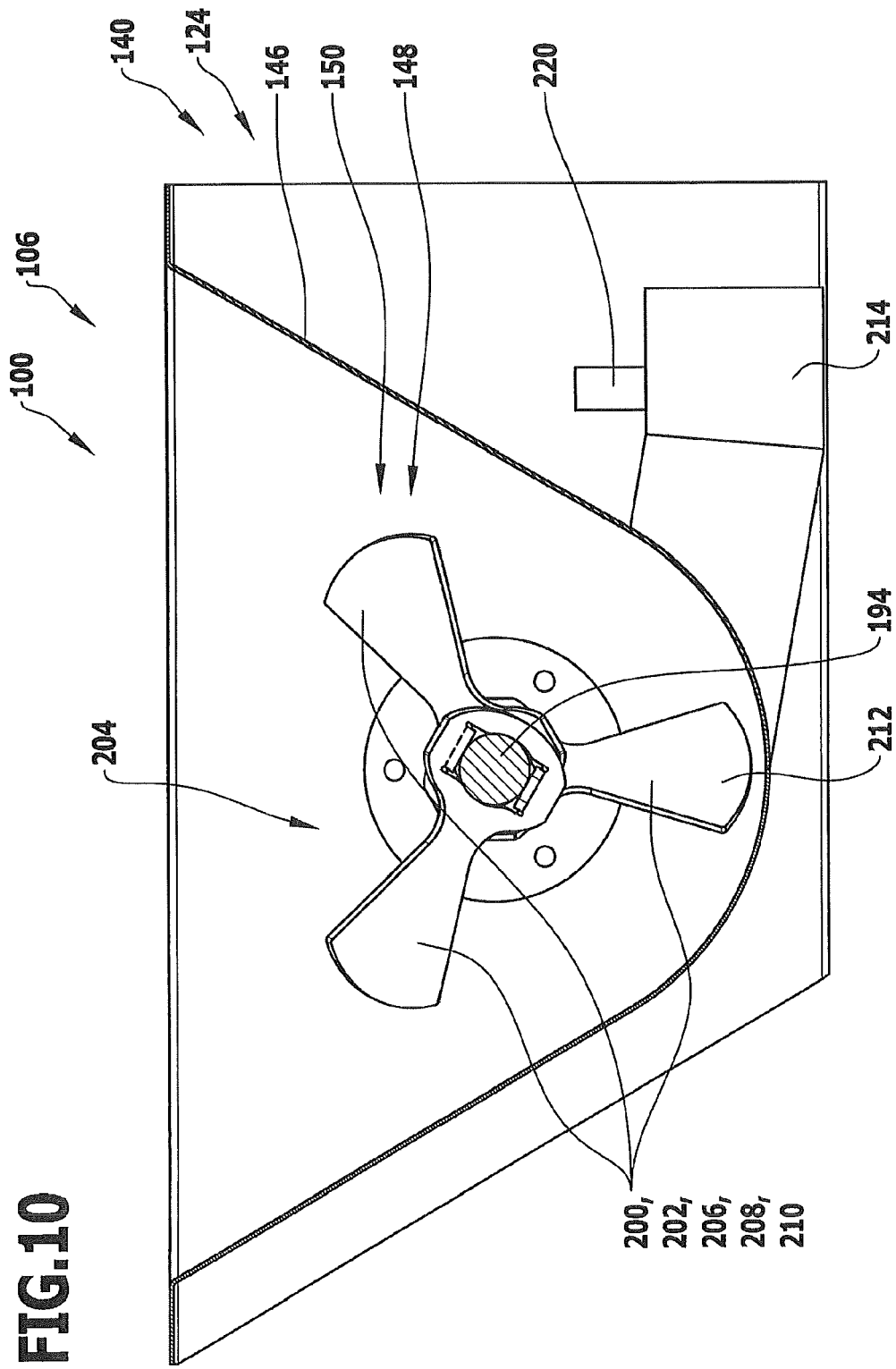
FIG. 10 shows a schematic view of a vertical section through the auxiliary filter material introduction mechanism from FIG. 8 along the line 10-10 in FIG. 9.

As can be derived from FIGS. 9 and 10, the auxiliary filter material introduction mechanism 148 comprises a shaft 194, which is rotatable by means of a drive device 192, comprising, for example, an electric motor, and which extends substantially parallel to the conveying direction 110 of the conveying device 108 of the painting installation 100 and is rotatable about a rotational axis 196, which is also oriented parallel to the conveying direction 110 of the conveying device 108 of the painting installation 100.

A rotational speed of the shaft 194 of the auxiliary filter material introduction mechanism 148 is controlled and/or regulated here by means of a control device 198.

A large number of treatment elements 200, which are configured, for example, as paddles 202, are arranged on the shaft 194 of the auxiliary filter material introduction mechanism 148, so the auxiliary filter material introduction mechanism 148 can be called a paddle mixer 204.

The auxiliary filter material introduction mechanism 148 is a treatment device 150 for the mechanical treatment of auxiliary filter material arranged in the auxiliary filter material receiving container 146 or a mixture of auxiliary filter material and overspray particles arranged in the auxiliary filter material receiving container 146.

The treatment device 150 is used here to convey auxiliary filter material within the auxiliary filter material receiving container 146. The treatment elements 200 of the treatment device 150 are therefore conveying elements 206.

Furthermore, the treatment elements 200 of the treatment device 150 are used to swirl auxiliary filter material or a mixture of auxiliary filter material and overspray particles, so the treatment elements 200 of the treatment device 150 form loosening elements 208.

Finally, the treatment elements 200 of the treatment device 150 are also used for mixing auxiliary filter material arranged in the auxiliary filter material receiving container 146 or a mixture of auxiliary filter material and overspray particles arranged in the auxiliary filter material receiving container 146, so the treatment elements 200 of the treatment device 150 also form mixing elements 210.

Basically, the treatment elements 200 of the treatment device 150 may have different forms depending on the task.

However, a substantially uniform form of the treatment elements 200 is provided in the embodiment of the auxiliary filter material introduction mechanism 148 shown in FIGS. 8 to 10.

Only the orientation of the treatment elements 200 in a treatment device 212 relative to the rotational axis 196 of the auxiliary filter material introduction mechanism 148 is not uniform for all the treatment elements 200. Rather, the treatment elements 200 in the treatment regions 212 are arranged rotated with respect to the rotational axis 196 of the auxiliary filter material introduction mechanism 148 in such a way that by means of a rotation of the shaft 194, and therefore of the treatment elements 200, about the rotational axis 196, auxiliary filter material arranged in the auxiliary filter material receiving container 146 or a mixture of auxiliary filter material and overspray particles can be conveyed to an outlet 214 of the auxiliary filter material receiving container 146 arranged substantially centrally on the auxiliary filter material receiving container 146.

Auxiliary filter material or a mixture of auxiliary filter material and overspray particles can be removed from the auxiliary filter material receiving container 146 by means of the outlet 214 of the auxiliary filter material receiving container 146. This takes place, in particular, when the specific absorption capacity of the auxiliary filter material or the mixture of auxiliary filter material and overspray particles, which is a measure of what quantity of overspray can still be absorbed by means of the auxiliary filter material or the mixture of auxiliary filter material and overspray particles, is no longer sufficient for reliable filter operation of the filter device 124.

In order to avoid a blocking of the outlet 214 when discharging auxiliary filter material or a mixture of auxiliary filter material and overspray particles, for example because of agglomerate formation, the outlet 214 is provided with a safety device 216, which is formed, for example, by two bars 218 arranged in a cross shape. The safety device 216 may, in particular, prevent excessively large agglomerates of auxiliary filter material and paint overspray reaching the outlet 214 and blocking it.

As can be derived, in particular from FIG. 10, the auxiliary filter material receiving container 146 furthermore comprises a compressed air connection 220, by means of which compressed air is feedable to the outlet 214. On the one hand, this can be used to remove a blockage in the outlet 214 and, on the other hand, to drive auxiliary filter material to be discharged by way of the outlet 214 or a mixture of auxiliary filter material and overspray particles.

The above-described painting installation 100 functions as follows.

In the painting booth 102 of the painting installation 100, a workpiece 104 is conveyed by means of the conveying device 108 in the conveying direction 110 and painted by means of a painting robot (not shown).

An air flow guided through the painting booth 102 is loaded thereby with overspray and fed together the overspray as a raw gas flow by way of the raw gas shaft 114 to the filter system 106. The raw gas shaft 114 guides the raw gas flow to the filter devices 124.

The raw gas flow is then distributed by means of inlet channels 122 over the raw gas chambers 136 of the filter devices 124.

The flow guidance devices 156 of the filter devices 124 are used for the specific feeding of the raw gas flow to the raw gas chambers 136, a specific feeding of the raw gas flow to the auxiliary filter material receiving containers 146 and the auxiliary filter material introduction mechanisms 148 arranged therein taking place, in particular, by means of the adjustable flow elements 158.

As a result, auxiliary filter material from an auxiliary filter material receiving container 146 can be swirled and picked up by the raw gas flow.

Overspray particles present in the raw gas flow already accumulate while flowing through a raw gas chamber 136 on particles of the auxiliary filter material. These agglomerates and overspray particles not yet accumulated on auxiliary filter material particles are then fed to the filter elements 142 of the filter devices 124 and deposited there on a protective layer formed from auxiliary filter material.

The raw gas flow thus freed of overspray particles is guided as a clean gas flow by way of the clean gas line 160 from the clean gas chamber 144 to the clean gas collecting channel 170 and, in this case, conditioned, for example heated, cooled, humidified and/or dehumidified by means of the conditioning device 172.

The clean gas flows from various filter devices 124 already mix in the mouth region 176 of the clean gas collecting channel 170.

By means of the fans 182 in the partition wall 180 of the clean gas collecting channel 170, clean gas is then fed to the discharge region 178 of the clean gas collecting channel 170 and then fed by means of a circulating air guidance device (not shown) to the painting booth 102 of the painting installation 100 again.

In particular, during a circulating air operation of this type, in which the gas flow is repeatedly guided through the painting booth 102, the feeding of the raw gas to the raw gas chamber 136 can be influenced by means of the flow guidance device 156 in order to adapt the raw gas flow in the filter devices 124 to an instantaneous volume flow of the raw gas flow in the raw gas shaft 114.

At least one variable flow element 158 is, in particular, adapted for this purpose.

It may, in particular, be advantageous if at least one variable flow element 158 is configured to rotate about the rotational axis 186 and has a mass, which makes it possible for the raw gas flow guided through the inlet channel 122 to deflect the flow element 158 from a rest position, in which the flow element 158 is oriented vertically, for example.

The flow element 158 is then automatically moved by means of the raw gas flow while flowing through the inlet channel 122, so a cross-section of the inlet channel 122 is automatically adapted, without a separate control, to a currently prevailing volume flow of the raw gas flow.

As a result, in particular, an advantageous swirling of auxiliary filter material from the auxiliary filter material receiving container 146 and an advantageous flow though the raw gas chamber 136 can be achieved for the reliable separation of overspray particles from the raw gas flow.

The auxiliary filter material arranged in the auxiliary filter material receiving container 146 or a mixture of auxiliary filter material and overspray particles is mixed and swirled by means of the auxiliary filter material introduction mechanism 148 configured as a treatment device 150 by rotating the treatment elements 200 of the treatment device 150 by means of the shaft 194 about the rotational axis 196 and simultaneously conveyed to the outlet 214 of the auxiliary filter material receiving container 146.

By mixing the auxiliary filter material arranged in the auxiliary filter material receiving container 146 or the mixture of auxiliary filter material and overspray particles, a constant quality, in particular a constant specific absorption capacity, of the auxiliary filter material fed to the raw gas flow can be ensured.

By swirling the auxiliary filter material or the mixture of auxiliary filter material and overspray particles, it can be ensured that an adequate quantity of auxiliary filter material is always fed to the raw gas flow.

By the conveyance of the auxiliary filter material or the mixture of auxiliary filter material and overspray particles to the outlet 214 of the auxiliary filter material receiving container 146, auxiliary filter material excessively contaminated with overspray particles can be fed particularly easily to the outlet 214 and removed by way of this outlet 214 from the auxiliary filter material receiving container 146.

In particular, when auxiliary filter material has been removed from the auxiliary filter material receiving container 146, it may be provided that fresh auxiliary filter material not loaded with overspray particles is fed by means of the feed device 154 to the funnel portion 140 of the filter device 124, and therefore to the auxiliary filter material receiving container 146.

Figure 11:
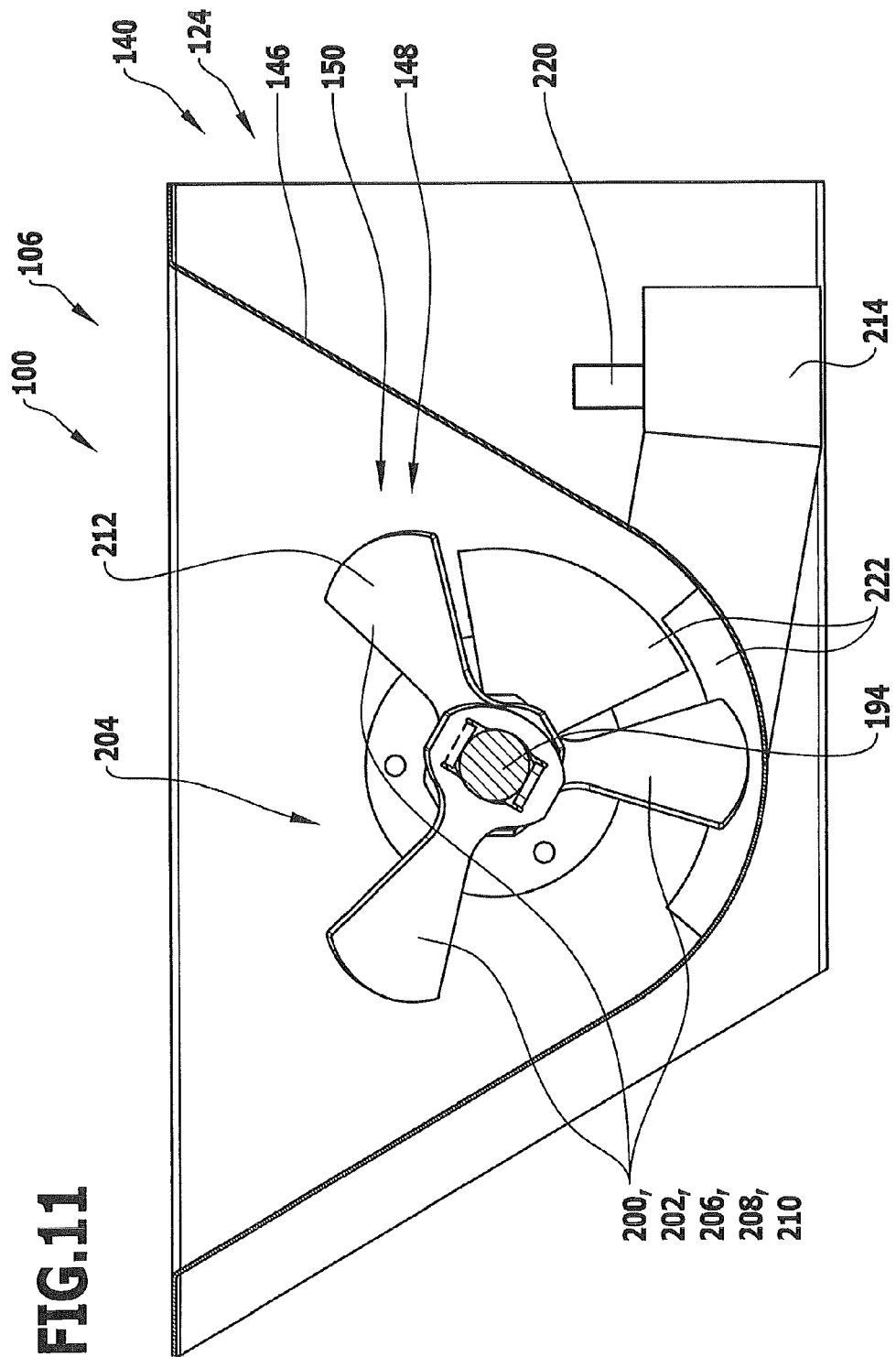
FIG. 11 shows a sectional view of an alternative embodiment of an auxiliary filter material introduction mechanism, comprising grinding plates, which corresponds to FIG. 10.

An alternative embodiment of an auxiliary filter material introduction mechanism 114 shown in FIG. 11 differs from the embodiment shown in FIGS. 1 to 10 substantially in that, in addition to the treatment elements 200, which form conveying elements 206, loosening elements 208 and simultaneously mixing elements 210, grinding plates 222 are provided, by means of which agglomerates of auxiliary filter material and overspray particles can be broken up and thus an average grain size of the mixture of auxiliary filter material and overspray particles can be reduced.

A grinding plate 222 is, for example, a disc mounted eccentrically on the shaft 194.

By using grinding plates 222 as additional treatment elements 200 of the treatment device 150, a mixture of auxiliary filter material and overspray particles can be used over a longer time period for filter operation of the filter device 124.

Otherwise, the embodiment of the auxiliary filter material introduction mechanism 148 shown in FIG. 11 coincides with respect to structure and function with the embodiments shown in FIGS. 1 to 10, so that, to this extent, reference can be made to the above description thereof.

Figure 12:
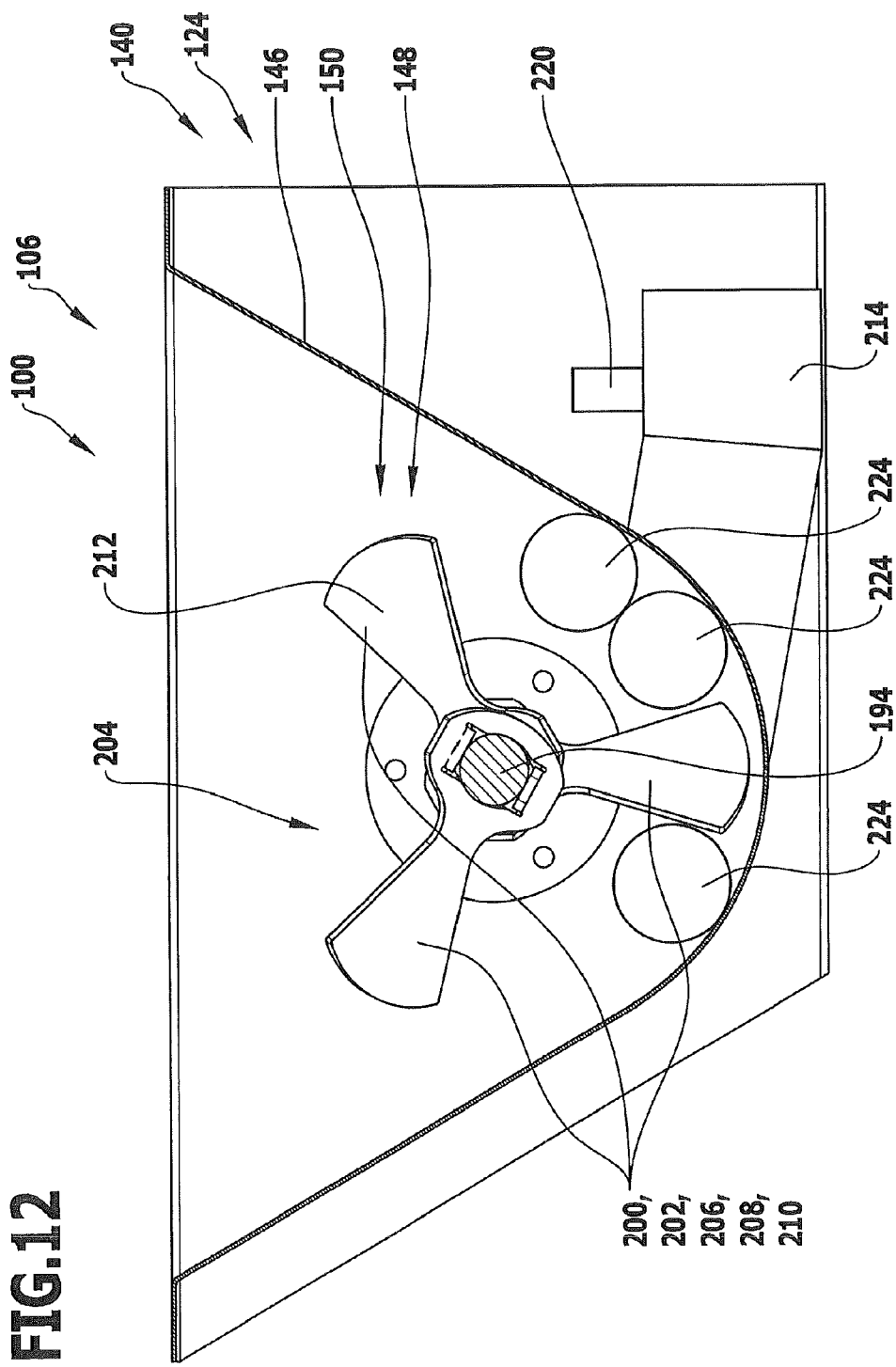
FIG. 12 shows a sectional view of a further alternative embodiment of an auxiliary filter material introduction mechanism, in which grinding balls are provided, which corresponds to FIG. 10.

A further alternative of the auxiliary filter material introduction mechanism 148 shown in FIG. 12 differs from the embodiment shown in FIG. 11 in that, to comminute agglomerates of auxiliary filter material and overspray particles, no grinding plates 222 are provided, but grinding balls 224 not connected to the shaft 194. These grinding balls 224 are moved back and forth by the rotation of the treatment elements 200 of the treatment device 150 about the rotational axis 196 of the shaft 194 in the auxiliary filter material receiving container 146, so that the desired effect of the mechanical treatment of the mixture of auxiliary filter material and overspray particles is produced by an abrasive action of the grinding balls 224.

Otherwise, the embodiment of an auxiliary filter material introduction mechanism 148 shown in FIG. 12 coincides with respect to structure and function with the embodiments shown in FIGS. 1 to 10, so that, to this extent, reference is made to the above description thereof.

Figure 13:
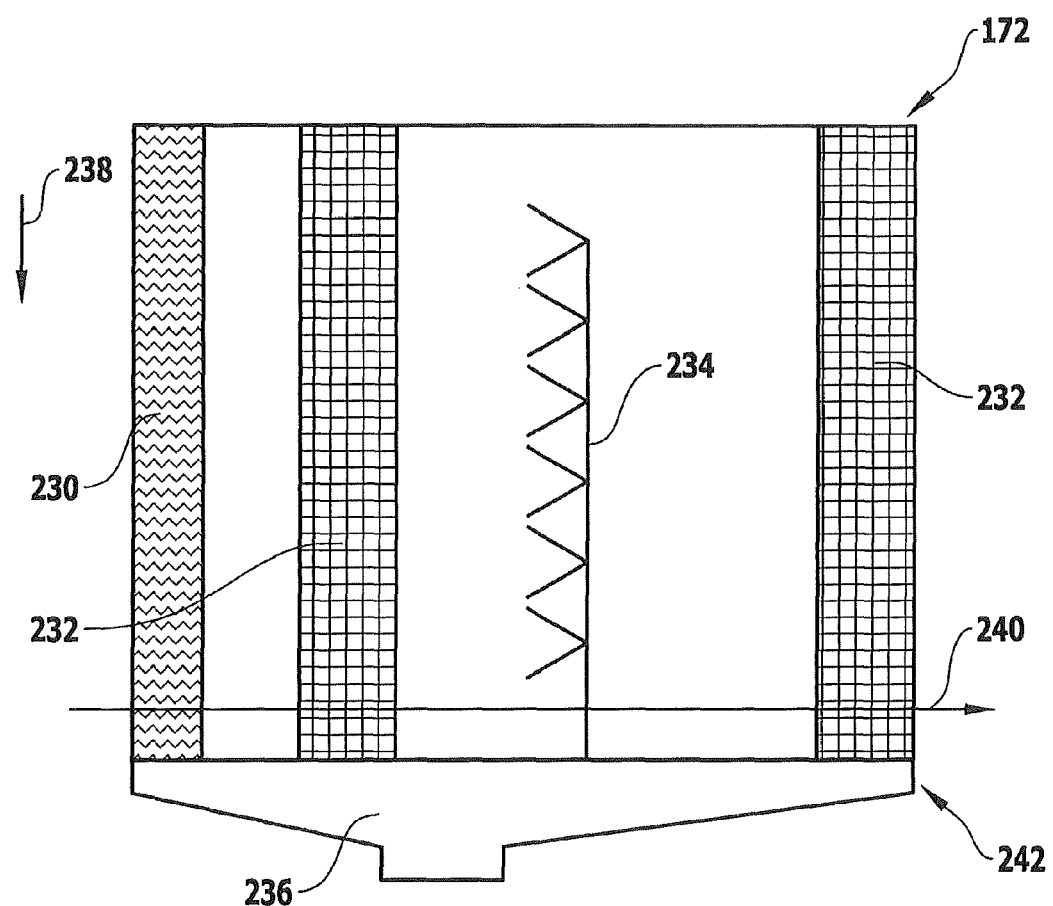
FIG. 13 shows a schematic sectional view of a conditioning device of the painting installation from FIG. 1.

An embodiment of a conditioning device 172 shown in FIG. 13 comprises a cooling device 230, two drop-separation devices 232 and a humidifying device 234.

The cooling device 230, one drop-separation device 232, the humidifying device 234 and the further drop-separation device 232 are arranged one after the other with respect to a through-flow direction 240 of the conditioning device 172.

A collecting trough 236 is arranged under the cooling device 230, the drop-separation devices 232 and the humidifying device 234 with respect to a gravitational force direction 238.

Condensate accumulating during operation of the conditioning device 172 in the cooling device 230, liquid drops separated by means of the drop separation device 232 and liquid, which is discharged from the humidifying device 234, but not absorbed by the gas flow, can be collected by means of the collecting trough 236.

The collecting trough 236 is therefore a common collecting trough 236 for all the condition elements of the conditioning device 172.

The conditioning device 172 therefore comprises a common liquid handling system 242 for handling the liquids accumulating or used during operation of the conditioning device 172, which system comprises the collecting trough 236.

The conditioning device 172 shown in FIG. 13 functions as follows.

When a gas flow flows through the conditioning device 172 in the through-flow direction 240, the latter is cooled by means of the cooling device 230. A condensate may form here, which flows in the gravitational force direction 238 along the cooling device 230 downwardly into the collecting trough 236.

The gas flow cooled by means of the cooling device 230 is then guided through a first drop-separation device 232, in order to be able to separate drops located in the gas flow.

Liquid, which flows downwardly into the collecting trough 236 in the gravitational force direction 238 also collects here.

The gas flow is moistened by means of the humidifying device 234 arranged in the through-flow direction 240 downstream of the first drop-separation device 232. For example, liquid is sprayed into the gas flow. The liquid not absorbed by the gas flow is also collected in the collecting trough 236.

The further drop-separation device 232 arranged downstream of the humidifying device 234 with respect to the through-flow direction 240 is again used to separate drops from the gas flow. Liquid drops, which flow downwardly into the collecting trough 236 in the gravitational direction 238 also collect on this drop-separation device 232 during operation of the conditioning device 172.

The total liquid accumulating or used during operation of the conditioning device 172 can therefore be collected by means of the collecting trough 236. The collecting trough 236 therefore forms a constituent of the common liquid handling system 242 of the conditioning device 272.

In a further embodiment (not shown) of a conditioning device 172, the humidifying device 234 is arranged directly downstream of the cooling device 230. The cooling device 230 can also be wetted with liquid here by means of the humidifying device 234. As a result, the efficiency of the conditioning device 172 can be increased during the humidifying of the gas flow guided through the conditioning device 172.

The above-described embodiments of conditioning devices 172 are suitable, in particular, for use in a painting installation 100, in particular a filter system 106 of a painting installation 100, for example in a filter module 184 of a filter system 106.

Figure 14:
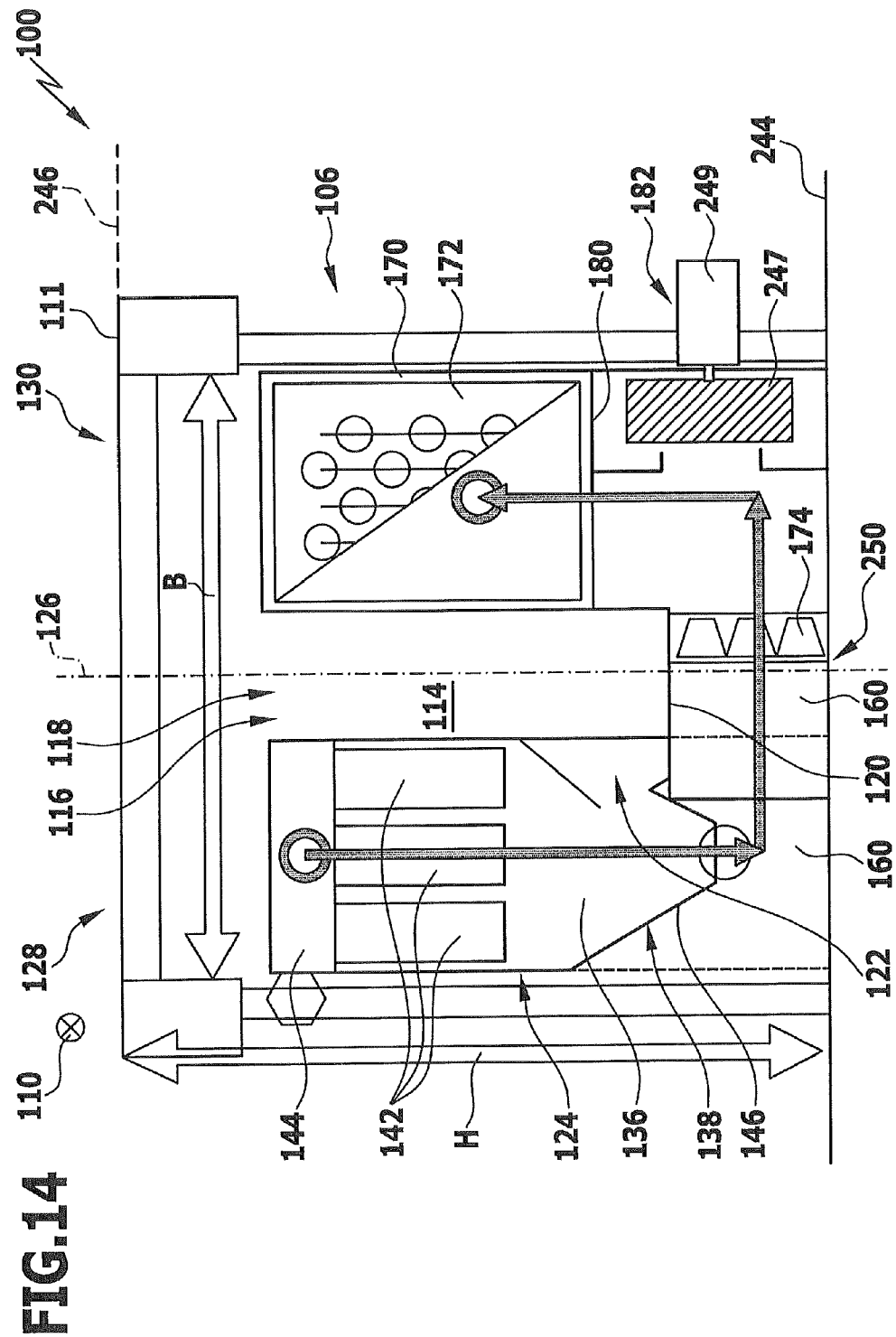
FIG. 14 shows a schematic vertical cross-section, corresponding to FIG. 4, through an alternative embodiment of a painting installation, in which a conditioning device is arranged downstream of a fan.
Figure 15:
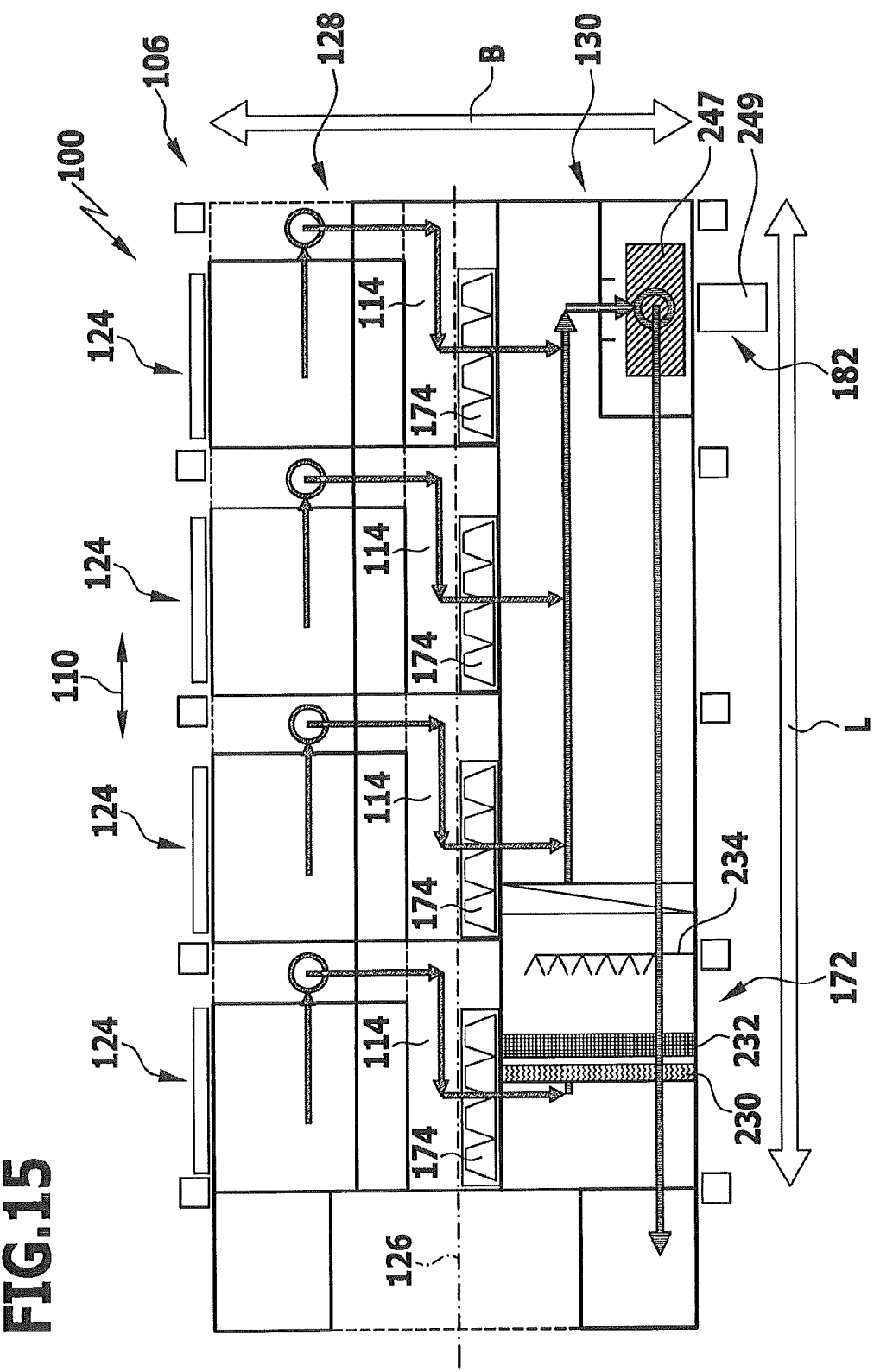
FIG. 15 shows a schematic plan view from above of the painting installation from FIG. 14.

An alternative embodiment of a painting installation 100 shown in FIGS. 14 and 15 differs from the embodiment shown in FIGS. 1 to 13 substantially in that the conditioning device 172 is arranged downstream of the fan 182 with respect to a flow direction of the clean gas flow.

The conditioning device 172 is, in particular, arranged here above a partition wall 180 of the clean gas collecting channel 170.

The filter system 106 of the embodiment of a painting installation 100 shown in FIGS. 14 and 15 preferably has a height H from a base 244, on which the painting installation 100 is arranged, up to a grid plane 246, which separates the painting booth 102 from the filter system 106, of about 6 m. A width B of the filter system 106 is preferably about 5 m.

As can be derived, in particular from FIG. 15, it is provided in the embodiment of a painting installation 100 shown in FIGS. 14 and 15 that the filter system 106 comprises four filter devices 124.

The clean gas lines 160 of the individual filter devices 124 open into the clean gas collecting channel 170 below the partition wall 180 of the clean gas collecting channel 170 and are guided by means of a fan 182 into the region above the partition wall 180 of the clean gas collecting channel 170. For this purpose, the fan 182 comprises an impeller 247, which is drivable by means of a drive 249.

The rotational axis of the impeller 247 of the fan 182 may be oriented substantially horizontally and transversely, preferably substantially perpendicularly, to the longitudinal direction of the painting booth 102 and/or to the conveying direction 110.

The drive 249 of the impeller 247 may be arranged in a transverse direction directed perpendicular to the longitudinal direction of the painting booth 102 and/or perpendicular to the conveying direction 110, laterally next to the fan 182, in particular laterally next to the impeller 247.

The drive 249 of the impeller 247 may be arranged at least partly, preferably substantially completely, outside the base area of the painting booth 102 or outside a vertical projection of the base face of the painting booth 102.

The rotational axis of the impeller 247 of the fan 182 may, however, also be oriented differently, for example substantially horizontally and substantially parallel to the longitudinal direction of the painting booth 102 and/or to the conveying direction 110. Furthermore, the rotational axis of the impeller 247 may also be substantially vertically oriented.

The drive 249 of the impeller 247 may be arranged in the longitudinal direction of the painting booth 102 and/or in the conveying direction 110 before or behind the fan 182.

The drive 249 of the impeller 247 may also be arranged vertically under or above the fan 182.

The drive 249 of the impeller 247 may be arranged at least partly, preferably substantially completely, within the base area of the painting booth 102 or within a vertical projection of the base area of the painting booth 102.

The conditioning device 172, by means of which the clean gas flow guided in the clean gas collecting channel 170 can be conditioned, is arranged in the region above the partition wall 180 of the clean gas collecting channel 170.

The total length L of the filter system 106 of the painting installation 100, according to the embodiment shown in FIGS. 14 and 15, is, for example, about 10 m.

Otherwise, the embodiment of a painting installation 100 shown in FIGS. 14 and 15 coincides with respect to structure and function with the painting installation 100 shown in FIGS. 1 to 13, so that, to this extent, reference is made to the above description thereof.

Figure 16:
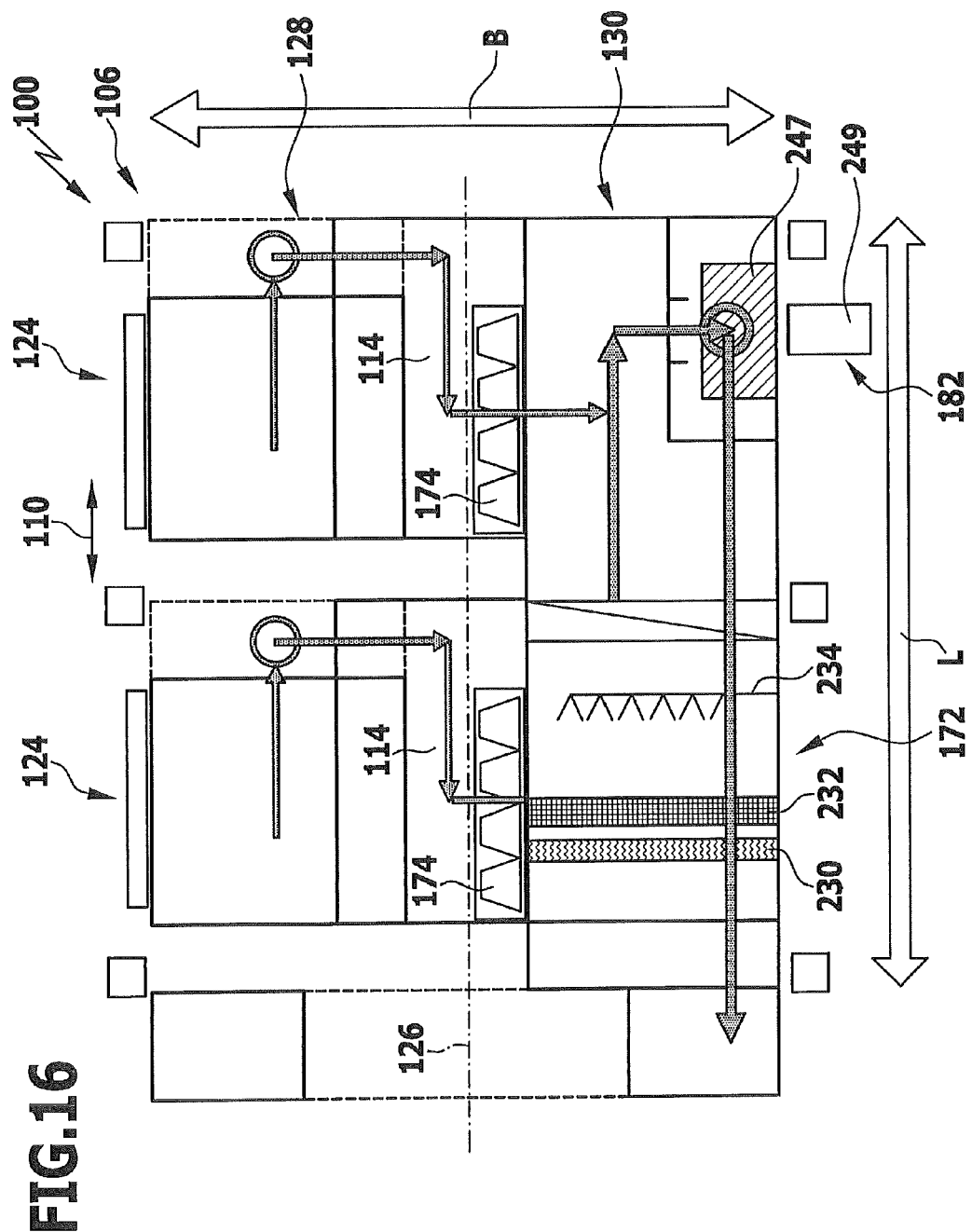
FIG. 16 shows a schematic plan view, corresponding to FIG. 15, from above of a further alternative embodiment of a painting installation, which comprises two filter devices.

An alternative embodiment of a painting installation 100 shown in FIG. 16 differs from the embodiment shown in FIGS. 14 and 15 substantially in that only two filter devices 124 are provided and the filter system 106 of the painting installation 100 has a length L of about 6 m.

Otherwise, the alternative embodiment of a painting installation 100 shown in FIG. 16 coincides with respect to structure and function with the embodiment shown in FIGS. 14 and 15 so that, to this extent, reference is made to the above description thereof.

Figure 17:
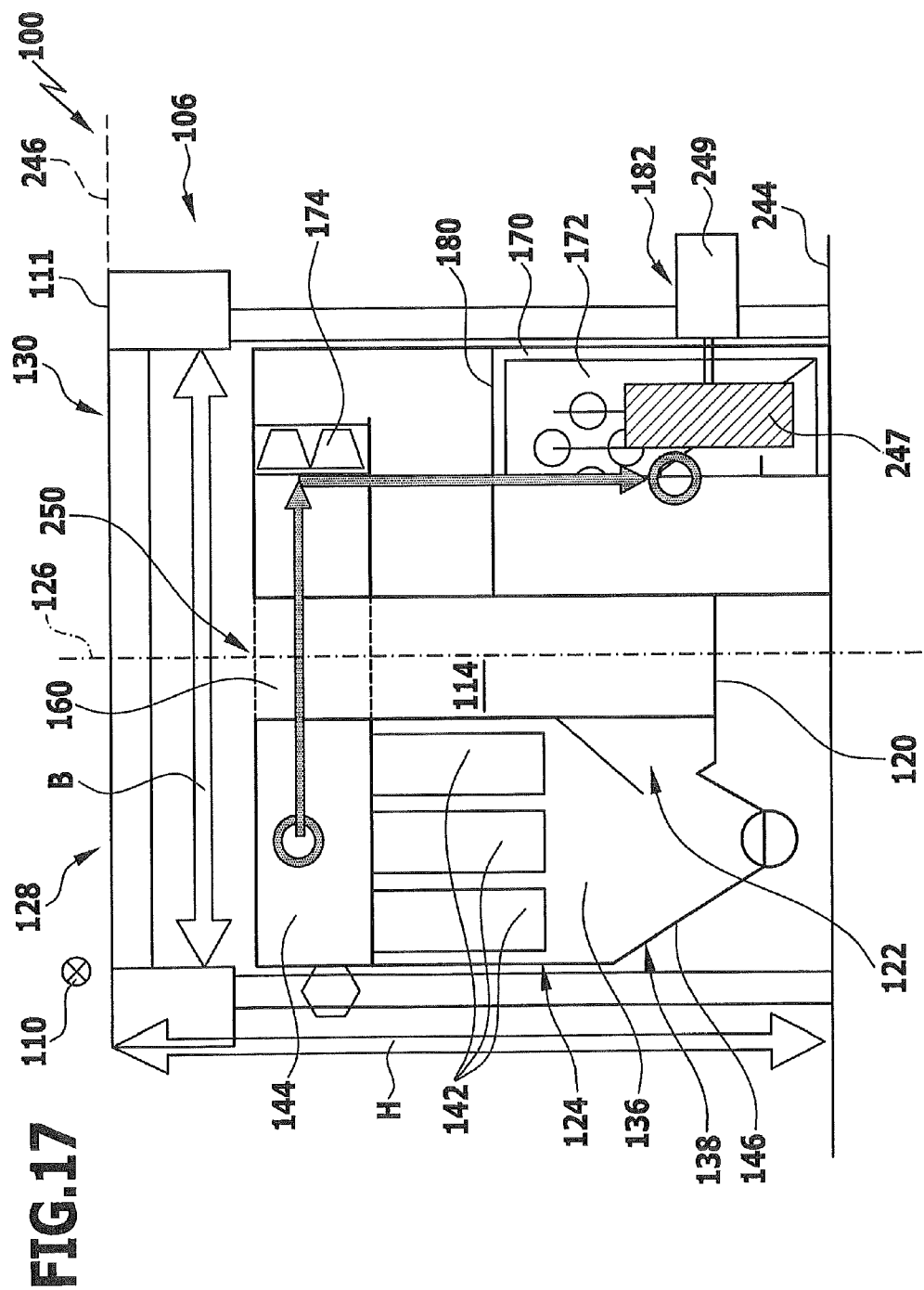
FIG. 17 shows a schematic vertical cross-section, corresponding to FIG. 14, through an alternative embodiment of a painting installation, in which a clean gas channel traverses a raw gas shaft.
Figure 18:
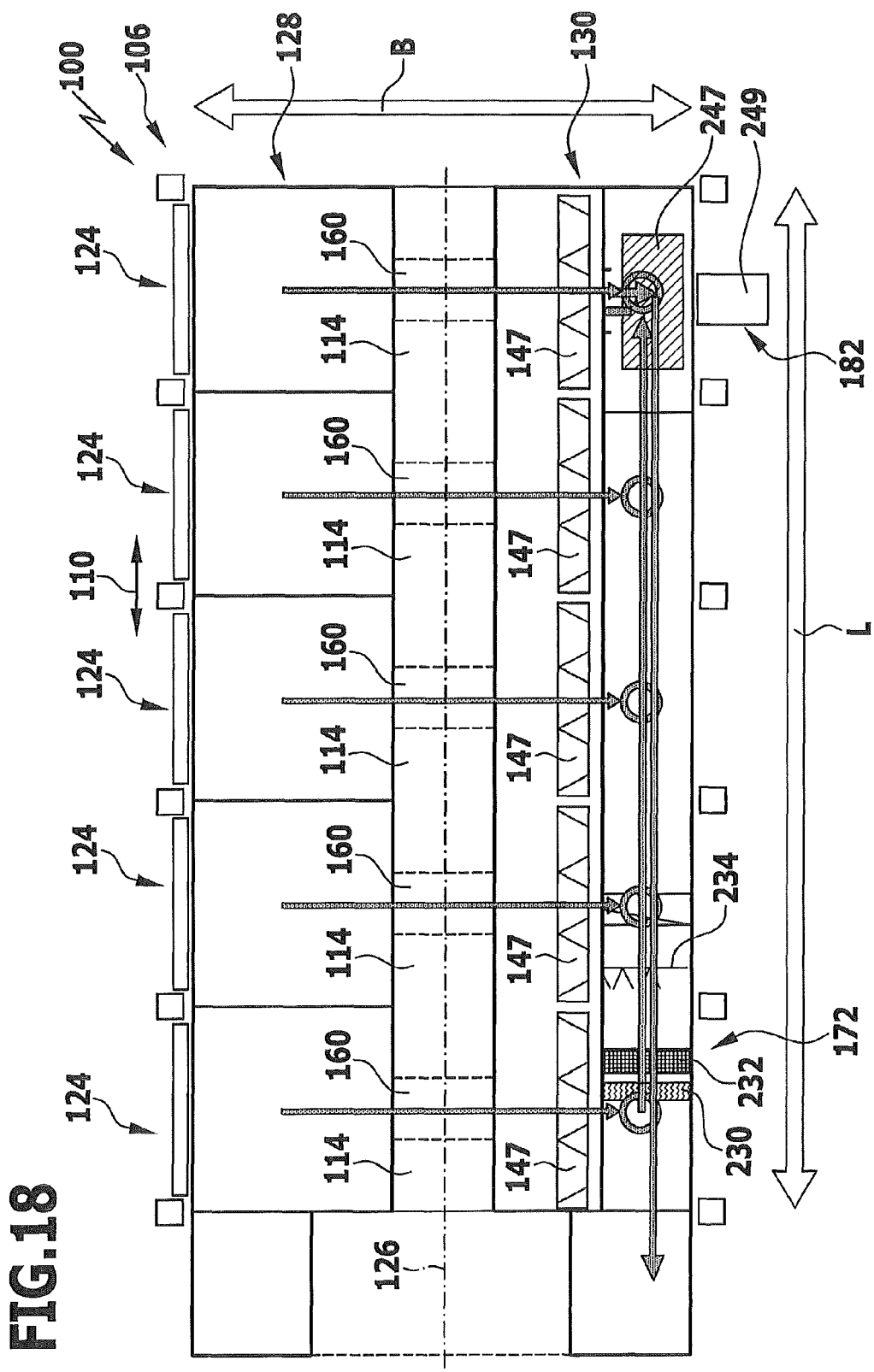
FIG. 18 shows a schematic plan view, corresponding to FIG. 15, of the painting installation from FIG. 17.

A further embodiment of a painting installation 100 shown in FIGS. 17 and 18 differs from the embodiment shown in FIGS. 14 and 15 substantially in that the clean gas lines 160 of the filter devices 124, proceeding from the clean gas chambers 144 of the filter devices 124 are guided in the substantially horizontal direction and substantially perpendicular to the conveying direction 110 of the conveying device 108 to the clean gas collecting channel 170.

The clean gas lines 160 are therefore not arranged below the raw gas shaft 114 in the embodiment of a painting installation 100 shown in FIGS. 17 and 18.

Rather, the clean gas lines 160 traverse the raw gas shaft 114 in the region of the upper end 116 of the raw gas shaft 114.

A clean gas line 160 traversing the raw gas shaft 114 comprises a portion, which is arranged inside the raw gas shaft 114, and may comprise one or more portions, which are arranged outside the raw gas shaft 114.

The clean gas lines 160 open here into the region of the clean gas collecting channel 170, which is arranged above the partition wall 180 of the clean gas collecting channel 170.

However, it may also be provided that at least one of the clean gas lines 160 is arranged at a different point between the lower end 120 and the upper end 116 of the raw gas shaft 114 or above the raw gas shaft 114, preferably below the painting booth base 111.

The clean gas flow collected in the region above the partition wall 180 of the clean gas collecting channel 170 is conveyed by means of the fan 182 into the region below the partition wall 180 of the clean gas collecting channel 170.

The conditioning device 172 is arranged below the partition wall 180 in the clean gas collecting channel 170, so that the clean gas flow guided below the partition wall 180 of the clean gas collecting channel 170 can be conditioned by means of the conditioning device 172.

As can be derived, in particular from FIG. 18, five filter devices 124 are provided in the embodiment of the painting installation 100 shown in FIGS. 17 and 18.

Otherwise, the embodiment of a painting installation 100 shown in FIGS. 17 and 18 coincides with respect to structure and function with the embodiment shown in FIGS. 14 and 15, so that, in this respect, reference is made to the above description thereof.

Figure 19:
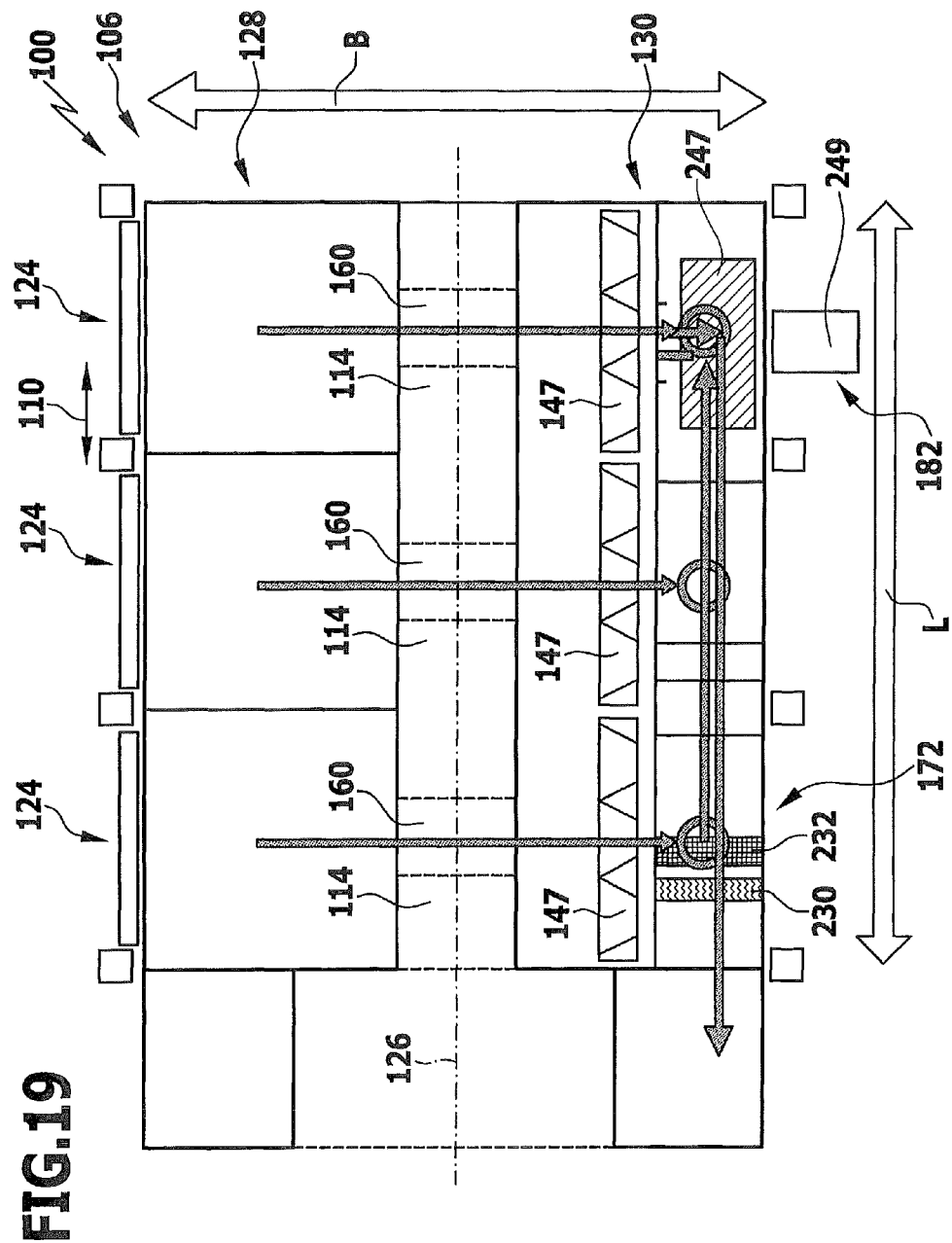
FIG. 19 shows a schematic plan view, corresponding to FIG. 18, of a further alternative embodiment of a painting installation, which comprises three filter devices.

A further alternative of the painting installation 100 shown in FIG. 19 differs from the embodiment shown in FIGS. 17 and 18 substantially in that only three filter devices 124 are provided.

The length L of the filter system 106 of the painting installation 100 is about 6 m here.

Otherwise, the embodiment of a painting installation 100 shown in FIG. 19 coincides with respect to structure and function with the embodiment shown in FIGS. 17 and 18, so reference is made, in this respect, to the above description thereof.

Figure 20:
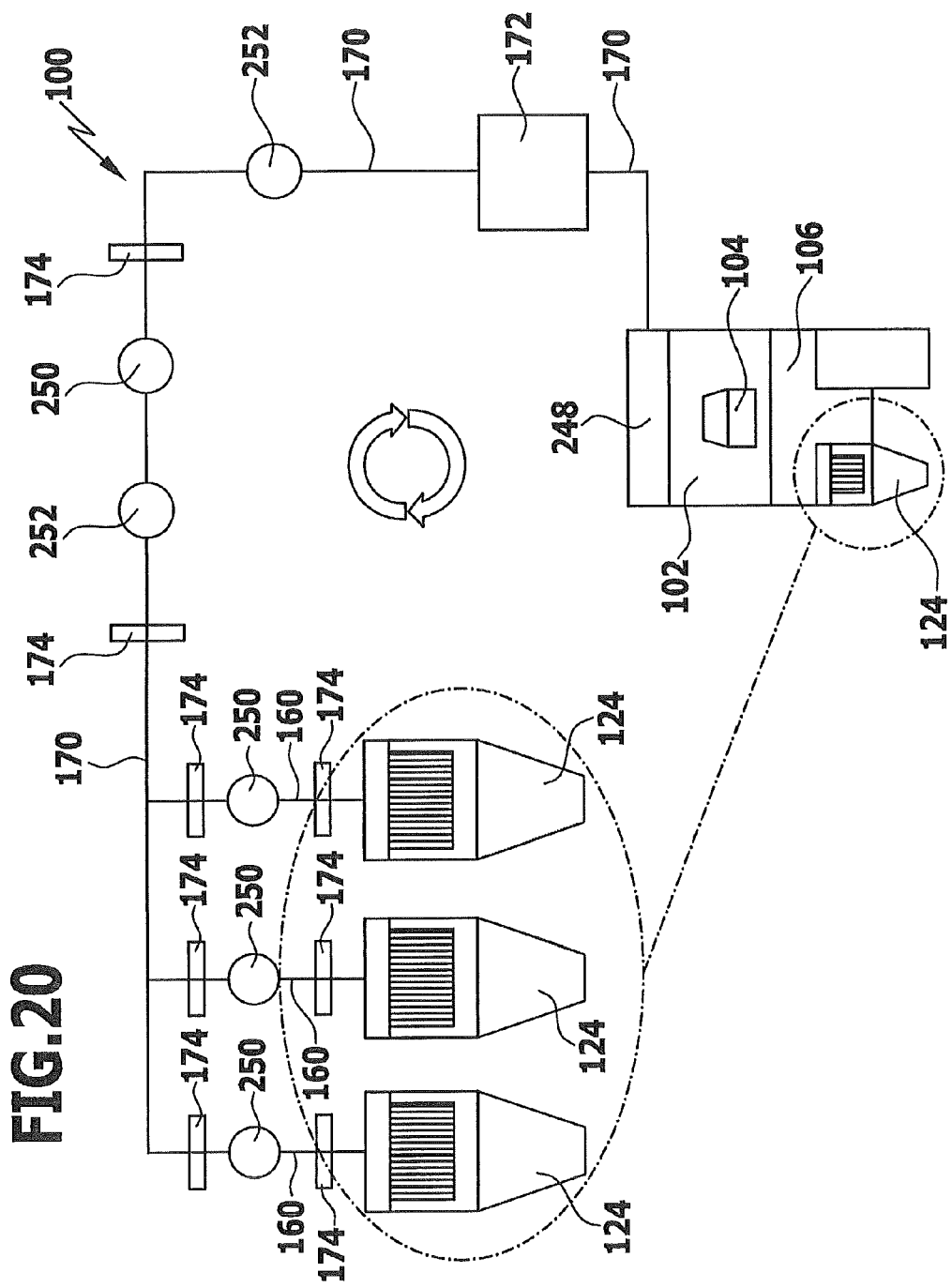
FIG. 20 shows a schematic view of the mode of functioning of various embodiments of painting installations.

FIG. 20 shows a schematic view to illustrate the mode of functioning of the different embodiments of painting installations 100.

The air required to operate the painting installation 100 is guided in a circulating air guide.

The air is firstly guided as a clean gas flow through a plenum 248 of the painting installation 100 into the painting booth 102.

A workpiece 104 is painted in the painting booth 102, so the clean gas flow is loaded with paint overspray.

The gas flow contaminated by this is fed as a raw gas flow to the filter system 106 and freed there of wet paint overspray, so a clean gas flow is obtained again.

The cleaning takes place here by means of three filter devices 124, for example.

The obtainable clean gas flows are fed by way of clean gas lines 160 to a clean gas collecting channel 170.

The collected clean gas flow is finally fed by means of a single, or by means of two, collecting channels 170 to a conditioning device 172 and conditioned in order to be able to be fed again by way of the plenum 248 to the painting booth 102 to the painting installation 100.

In order to prevent the penetration of auxiliary filter material into the conditioning device 172 in the event of damage to a filter device 124, at least one safety filter 174 is provided.

The safety filter 174 can also be called a policing filter because of its function and is used, in particular, for safety in the event of a filter rupture.

Basically, it may be provided that safety filters 174 are arranged in each clean gas line 160. The safety filters 174 may be arranged here on the side of the filter device 124 with respect to the vertical longitudinal center plane 126 of the painting installation 100, in other words before a crossing 250 of the vertical longitudinal center plane 126, or on the side of the clean gas collecting channel 170, in other words after the crossing 250 of the vertical longitudinal center plane 126.

As an alternative or in addition to this, it may be provided that at least one safety filter 174 is arranged in the clean gas collecting channel 170.

A safety filter 174 may be arranged here, depending on the configuration of the clean gas collecting channel 170, before or after the crossing 250 of the vertical longitudinal center plane 126 of the painting installation 100.

In particular, when the painting installation 100 comprises a channel connection 252, which may be configured as a channel piece or a connecting opening, it may be provided that a safety filter 174 is arranged before or after the channel connection 252.

The channel connection 252 may be arranged here before or after the crossing 250 of the vertical longitudinal center plane 126.

The details "before" and "after" always relate here to the flow direction of the clean gas flow or raw gas flow.

To drive the air flow, in particular the clean gas flow and the raw gas flow, a common fan 182 may be provided, for example in the clean gas collecting channel 170.

As an alternative or in addition to this, it may be provided that a fan 182 is arranged in a channel connection 252 within a crossing 250 of the vertical longitudinal center plane 126 and/or in a clean gas line 160. It may be provided, in particular, that a fan 182 is arranged in each clean gas line 160.

The conditioning device 172 may be arranged in the clean gas collecting channel 170 to condition the entire clean gas flow.

As an alternative or in addition to this, it may be provided that a conditioning device 172 is arranged in each clean gas line 160.

In particular, when a plurality of conditioning devices 172 are provided, it may be provided that each conditioning device 172 conditions all the parameters of the gas flow, in other words, that the gas flow is conditioned, in particular, with regard to its temperature and its air humidity. As an alternative to this, it may be provided that different parameters are conditioned by means of the conditioning devices 172; this means that, for example, a humidifying process is carried out by means of a conditioning device 172 and a heating of the clean gas flow is carried out by means of a further conditioning device 172. By feeding the clean gas flows to the clean gas collecting channel 170, a completely conditioned total air flow is then preferably obtained.

In particular when the painting installation 100 comprises a channel connection 252, it may be provided that the filter system 106 comprises two clean gas collecting channels 170, namely a clean gas collecting channel 170 before the channel connection 252 and a clean gas collecting channel 170 after the channel connection 252.

Other advantageous embodiments are the following.

1. Painting installation for painting workpieees (104), comprising:
   a painting booth (102), in which the workpieces (104) are paintable with paint;
   a conveying device (108), by means of which the workpieces (104) to be painted are conveyable in a conveying direction (110) through the painting booth (102);
   a separation and/or filter system (106) for cleaning a raw gas flow, which is leaving the painting booth (102) and has absorbed paint overspray in the painting booth (102), wherein the separation and/or filter system (106) comprises at least one filter device (124) for separating the paint overspray from the raw gas flow; and
   at least one clean gas line (160) for a clean gas flow, which is obtainable by cleaning the raw gas flow by means of the at least one filter device (124).

2. Painting installation according to embodiment 1, characterized in that the filter system (106) comprises at least one raw gas shaft (114), which is arranged substantially centrally below the painting booth (102) with respect to a horizontal direction running perpendicular to the conveying direction (110).

3. Painting installation according to either of embodiments 1 or 2, characterized in that the filter system (106) comprises at least one clean gas line (160) which is arranged, at least in portions, below a raw gas shaft (114).

4. Painting installation according to any one of embodiments 1 to 3, characterized in that the filter system (106) comprises a clean gas line (160), which crosses and/or traverses a raw gas shaft (114).

5. Painting installation according to any one of embodiments 1 to 4, characterized in that the filter system (106) comprises at least one clean gas collecting channel (170), into which at least two clean gas lines (160) of the filter system (106) open, at least one clean gas collecting channel (170), on the one hand, and at least two filter devices (124), on the other hand, being arranged on mutually opposing sides (128, 130) of the filter system (106) with respect to a vertical longitudinal center plane (126) of the painting booth (102).

6. Painting installation according to any one of embodiments 1 to 5, characterized in that at least one clean gas line (160) is arranged, at least in portions, within an outer contour (163) of at least one filter device (124).

7. Painting installation according to any one of embodiments 1 to 6, characterized in that the filter system (106) comprises at least one clean gas line (160), at least one fan (182), at least one conditioning device (172) and/or at least one clean gas collecting channel (170), which are arranged within a vertical projection of the painting booth (102) below the painting booth (102).

8. Painting installation according to any one of embodiments 1 to 7, characterized in that the filter system (106) comprises at least one filter module (184), which comprises at least one filter device (124), at least one clean gas line (160), at least one conditioning device (172) and/or at least one fan (182).

9. Painting installation, in particular according to any one of embodiments 1 to 8, characterized in that at least one filter device (124) for the separation of paint overspray from the raw gas flow containing overspray particles, comprises:
   a housing (134), which delimits a raw gas chamber (136) of the filter device (124) and in which at least one filter element of the filter device (124) is arranged;
   at least one inlet channel (122) for letting the raw gas flow into the raw gas chamber (136) of the filter device (124); and
   at least one auxiliary filter material introduction mechanism (148) for introducing auxiliary filter material into the raw gas flow.

10. Painting installation according to embodiment 9, characterized in that at least one auxiliary filter material introduction mechanism (148) comprises a treatment device (150) for the mechanical treatment of auxiliary filter material and/or a mixture of auxiliary filter material and overspray particles.

11. Painting installation according to either of embodiments 9 or 10, characterized in that the at least one auxiliary filter material introduction mechanism (148) comprises a flow guidance device (156) for influencing the flow of the raw gas flow, which device comprises at least one flow element (158c), which is variable with respect to configuration and/or arrangement and/or orientation and is, in particular, configured as an adjustably and/or pivotably arranged guide plate (188).

12. Painting installation according to any one of embodiments 9 to 11, characterized in that the filter device (124) comprises a control device (198), by means of which an introduction capacity of the at least one auxiliary filter material introduction mechanism (148) is configured to be controlled and/or regulated.

13. Painting installation according to any one of embodiments 1 to 12, characterized in that at least one filter device (124) of the filter system (106) comprises at least one flow guidance device (156), which is arranged in the raw gas chamber (136) of the filter device (124) and by means of which the raw gas flow flowing through at least one inlet channel (122) of the filter device (124) into the raw gas chamber (136) is configured to be influenced.

14. Painting installation according to any one of embodiments 1 to 13, characterized in that the filter system (106) comprises a conditioning device (172), which comprises a cooling device (230), a humidifying device (234) and/or a drop-separation device (232) as well as a common liquid handling system (242) for the cooling device (230), the humidifying device (234) and/or the drop-separation device (232).

15. Method for operating a painting installation (100), comprising the following method steps:
   conveying the workpieces (104) in a conveying direction (110) through the painting booth (102) by means of a conveying device (108) and painting the workpieces (104) in the painting booth (102);

feeding a raw gas flow from the painting booth (102) of the painting installation (100), which has absorbed paint overspray in the painting booth (102), to a filter system (106);

separating paint overspray from the raw gas flow loaded with overspray particles by means of at least one filter device (124) of the filter system (106), so that a clean gas flow is obtained, characterized in that auxiliary filter material and/or a mixture of auxiliary filter material and overspray particles is loosened by means of at least one auxiliary filter material introduction mechanism (148), in particular by means of a treatment device (150) for the mechanical treatment of auxiliary filter material and/or a mixture of auxiliary filter material and overspray particles, in that at least a part of the raw gas flow is introduced into at least one auxiliary filter material receiving container (146) of at least one filter device (124) and in that the loosened auxiliary filter material and/or the loosened mixture of auxiliary filter material and overspray particles is entrained by the raw gas flow and thereby mixes with the raw gas of the raw gas flow.

16. Method according to embodiment 15, characterized in that the clean gas flow is guided away by means of at least one clean gas line (160), which is arranged, at least in portions, within an outer contour (163) of at least one filter device (124) and in that at least one clean gas line (160) is guided through below a raw gas shaft (114) of the painting installation (100) and/or in that at least one clean gas line (160) traverses the raw gas shaft (114).

17. Method according to either of embodiments 15 or 16, characterized in that the raw gas flow is guided by way of at least one inlet channel (122) of at least one filter device (124) into a raw gas chamber (136) of the at least one filter device (124), auxiliary filter material being fed to the raw gas flow by means of at least one auxiliary filter material introduction mechanism (148).

That which is claimed:

1. A painting installation for painting workpieces, comprising:
   a painting booth, in which the workpieces are paintable with paint and conveyable in a conveying direction through the painting booth;
   a filter system for cleaning a raw gas flow, which is leaving the painting booth and has absorbed paint overspray in the painting booth, wherein the filter system comprises at least two filters for separating the paint overspray from the raw gas flow and at least two clean gas lines, each clean gas line positioned to receive a clean gas flow exiting at least one filter
   wherein the filter system comprises at least one clean gas collecting channel positioned to receive clean gas flow from the at least two clean gas lines, wherein the entire at least one clean gas collecting channel, on the one hand, and the entire at least two filters, on the other hand, being arranged on mutually opposing sides of the filter system with respect to a vertical longitudinal center plane of the painting booth.

2. The painting installation according to claim 1, wherein the filter system comprises a clean gas line, which at least one of crosses and traverses a raw gas shaft, wherein raw gas flows around the clean gas line during operation of the painting installation.

3. The painting installation according to claim 2, wherein the filter system comprises at least one of the following components: at least one clean gas line, at least one fan, at least one conditioning device comprising one or more of a heater, a cooler, humidifier, and a dehumidifier and configured to heat, cool, humidify or dehumidify a clean gas flow, and at least one gas collecting channel, these components being arranged within a vertical projection of the painting booth below the painting booth.

4. The painting installation according to claim 1, wherein the filter system comprises at least one raw gas shaft, which is arranged substantially centrally below the painting booth with respect to a horizontal direction running perpendicular to the conveying direction.

5. The painting installation according to claim 1, wherein the filter system comprises at least one clean gas line which is arranged, at least in portions, below a raw gas shaft.

6. The painting installation according to claim 1, wherein the speed of raw gas flow flowing into the raw chamber of a filter is increasable by means of at least one flow element of at least one flow guidance device.

7. The painting installation according to claim 1, wherein at least one clean gas line is arranged, at least in portions, within an outer contour of at least one filter.

8. The painting installation according to claim 1, wherein the filter system comprises at least one filter module, which comprises at least one of the following components: at least one filter, at least one clean gas line, at least one conditioning device comprising one or more of a heater, a cooler, a humidifier, and a dehumidifier and configured to heat, cool, humidify or dehumidify a clean gas flow, and at least one fan.

9. The painting installation according to claim 1, wherein at least one filter for the separation of paint overspray from a raw gas flow containing overspray particles, comprises:
   a housing, which delimits a raw gas chamber of the filter and in which at least one filter element of the filter is arranged;
   at least one inlet channel for letting the raw gas flow into the raw gas chamber of the filter; and
   at least one auxiliary filter material introduction mechanism for introducing auxiliary filter material into the raw gas flow, wherein at least one clean gas line of the filter is arranged, at least in portions, within an outer contour of at least one filter and wherein at least one safety filter is provided in at least one clean gas line.

10. The painting installation according to claim 9, wherein at least one auxiliary filter material introduction mechanism comprises a treatment device for the mechanical treatment of at least one of auxiliary filter material and a mixture of auxiliary filter material and overspray particles.

11. The painting installation according to claim 9, wherein the at least one auxiliary filter material introduction mechanism comprises a flow guidance device for influencing the flow of the raw gas flow, which device comprises at least one flow element, which is variable with respect to at least one of configuration and arrangement and orientation and is configured as at least one of an adjustably and pivotably arranged guide plate.

12. The painting installation according to claim 9, wherein the filter comprises a control device, by means of which an introduction capacity of the at least one auxiliary filter material introduction mechanism is configured to be regulated.

13. The painting installation according to claim 1, wherein at least one filter of the filter system comprises at least one flow guidance device, which is arranged in the raw gas chamber of the filter and by means of which the raw gas flow flowing through at least one inlet channel of the filter into the raw gas chamber is configured to be influenced.

14. The painting installation according to claim 1, wherein the filter system comprises a conditioning device comprising one or more of a cooler, a humidifier, and a dehumidifier and configured to cool, humidify or dehumidify a clean gas flow, as well as a common liquid handling system for at least one of the cooler, humidifier, and dehumidifier.

* * * * *